(12) United States Patent
Tahan

(10) Patent No.: US 11,089,062 B2
(45) Date of Patent: Aug. 10, 2021

(54) AUTOMATED SECURITY ARCHITECTURE FORMULATION AND DEPLOYMENT

(71) Applicant: International Business Machines Corporation, Armonk, NY (US)

(72) Inventor: Thomas Tahan, San Diego, CA (US)

(73) Assignee: International Business Machines Corporation, Armonk, NY (US)

(*) Notice: Subject to any disclaimer, the term of this patent is extended or adjusted under 35 U.S.C. 154(b) by 104 days.

(21) Appl. No.: 16/555,330

(22) Filed: Aug. 29, 2019

(65) Prior Publication Data
US 2021/0067556 A1 Mar. 4, 2021

(51) Int. Cl.
  *H04L 29/06* (2006.01)
(52) U.S. Cl.
  CPC .......... *H04L 63/20* (2013.01); *H04L 63/0209* (2013.01)
(58) Field of Classification Search
  CPC .......................... H04L 63/20; H04L 63/0209
  See application file for complete search history.

(56) References Cited

U.S. PATENT DOCUMENTS

| | | | |
|---|---|---|---|
| 2004/0221154 A1* | 11/2004 | Aggarwal | H04L 9/0844 713/151 |
| 2009/0228951 A1* | 9/2009 | Ramesh | H04L 63/0218 726/1 |
| 2013/0124851 A1* | 5/2013 | Kain | H04L 69/162 713/151 |
| 2014/0011341 A1 | 1/2014 | Sabetta et al. | |
| 2014/0130117 A1* | 5/2014 | Jeannot | G06F 21/34 726/1 |
| 2014/0165204 A1* | 6/2014 | Williams | H04L 63/02 726/25 |
| 2016/0219077 A1* | 7/2016 | Pandya | H04L 63/20 |
| 2016/0234686 A1* | 8/2016 | Bone | G06F 13/1689 |
| 2016/0259946 A1* | 9/2016 | Mardikar | G06F 21/577 |
| 2017/0006063 A1* | 1/2017 | Sundaram | H04L 63/0815 |
| 2017/0013002 A1* | 1/2017 | Stevenson | H04L 63/1433 |
| 2017/0155511 A1* | 6/2017 | Haridas | H04L 63/0428 |
| 2017/0214708 A1 | 7/2017 | Gukal et al. | |
| 2017/0279826 A1 | 9/2017 | Mohanty et al. | |
| 2018/0004953 A1* | 1/2018 | Smith, II | G06F 21/78 |
| 2019/0303541 A1* | 10/2019 | Reddy | H04L 9/0643 |

* cited by examiner

*Primary Examiner* — Yonas A Bayou
(74) *Attorney, Agent, or Firm* — Yee & Associates, P.C.

(57) ABSTRACT

Formulating a security architecture for an information system is provided. A description of a target environment of the information system is received. The description includes a network zone architecture. A description of one or more security requirements for the information system is received. One or more reference architectures for the information system are selected from a plurality of reference architectures based on the description of the one or more security requirements for the information system. One or more selected reference architectures are adapted to the target environment for the information system.

27 Claims, 15 Drawing Sheets

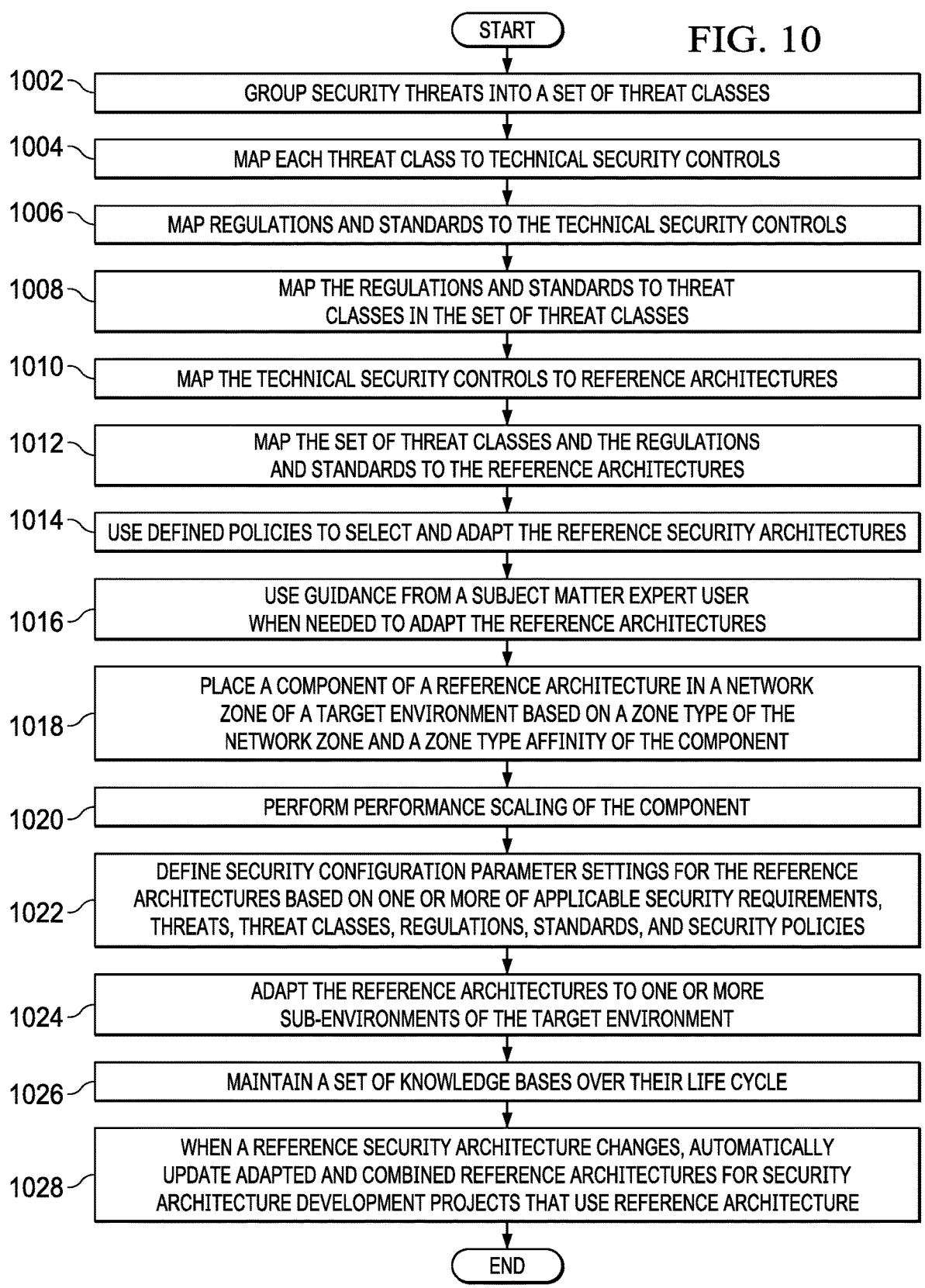

AUTOMATED SECURITY ARCHITECTURE FORMULATION AND DEPLOYMENT

BACKGROUND

1. Field

The disclosure relates generally to information security and more specifically to automatically formulating and deploying security architectures to address specific security requirements for a target environment.

2. Background

Information security consists of the policies, controls, and practices adopted to prevent and monitor unauthorized access, misuse, modification, or denial of service of an information system. Information security includes the authorization of access to the information system and its resources. Typically, users choose or are assigned an identifier, such as a user name, and a password or other authenticating information that allows the users access to the information system and its resources within their authority. For example, once authenticated, a firewall enforces rules and policies that defined what resources the information system users are allowed to access.

However, information systems are subject to attacks by malicious users. Attacks may be passive or active. A passive attack is when a malicious user intercepts data traveling through the information system's network or between the information system and external entities. An active attack is when a malicious user initiates commands to disrupt the information system's normal operation or to conduct reconnaissance and lateral movement to find and gain access to resources available via the information system's network.

Companies and organizations need comprehensive information technology (IT) system security architectures for both existing IT systems, and for IT modernization including workload migration to new data centers and public and private clouds. Assessing the adequacy of existing security controls is challenging in the face of evolving security threats, as is formulating new security architectures for new data centers, clouds, and hybrid data centers and clouds.

SUMMARY

According to one illustrative embodiment, a computer-implemented method for formulating a security architecture for an information system is provided. A description of the target environment of the information system is received. The description includes a set of a network zone architecture. A description of one or more security requirements for the information system is received. One or more reference architectures for the information system are selected from a plurality of reference architectures based on the description of the security requirements for the information system. One or more selected reference architectures are adapted to the target environment for the information system. According to other illustrative embodiments, a computer system and computer program product for formulating a security architecture for an information system are provided.

BRIEF DESCRIPTION OF THE DRAWINGS

FIG. 10 is a flowchart illustrating a process for formulating a security architecture in accordance with an illustrative embodiment.

DETAILED DESCRIPTION

Figure 1:
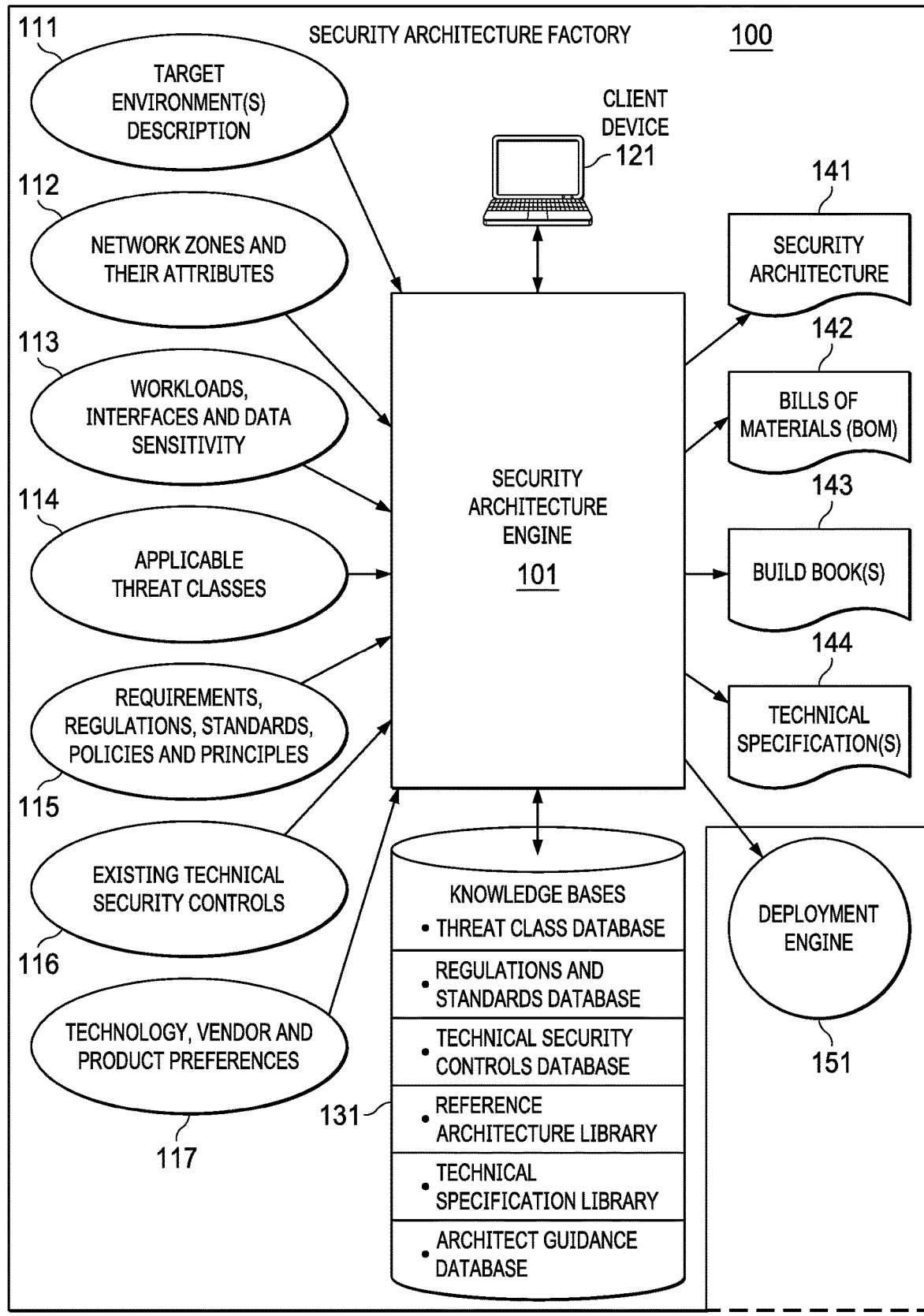
FIG. 1 is a diagram illustrating an example of a security architecture factory in accordance with an illustrative embodiment.
Figure 2A:
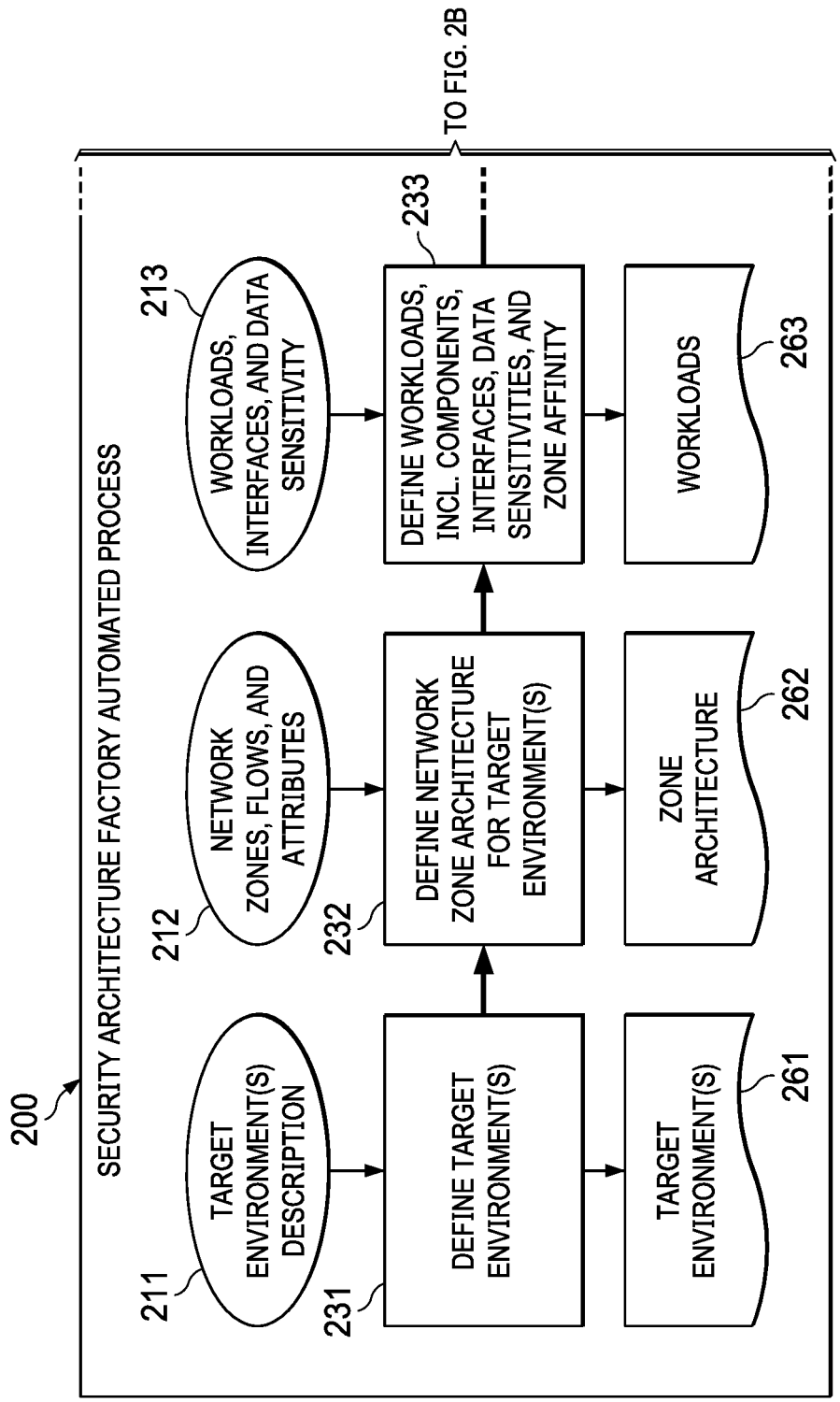
FIGS. 2A-2F are a diagram illustrating an example of a security architecture factory automated process in accordance with an illustrative embodiment.
Figure 2B:
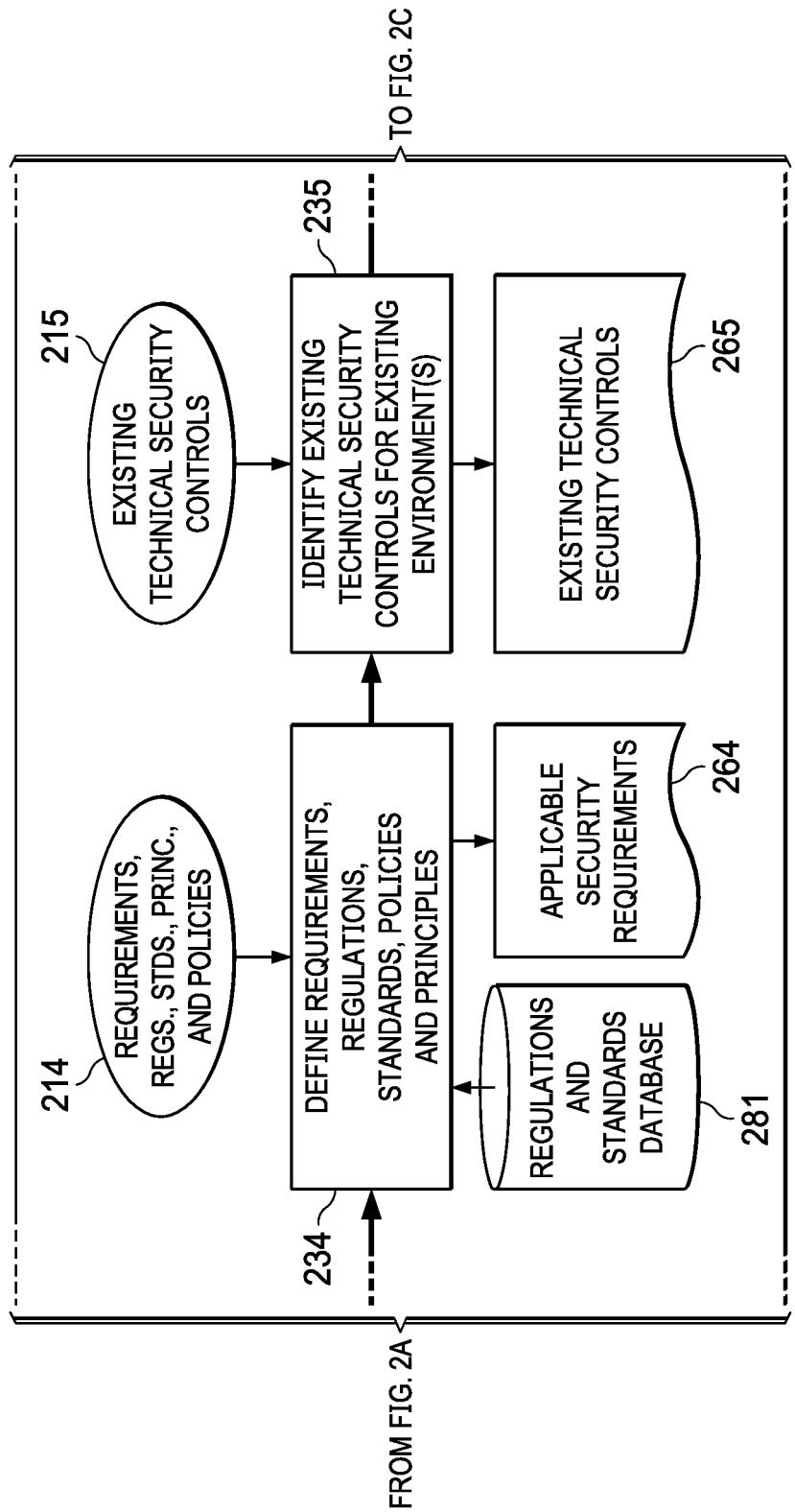
Figure 2C:
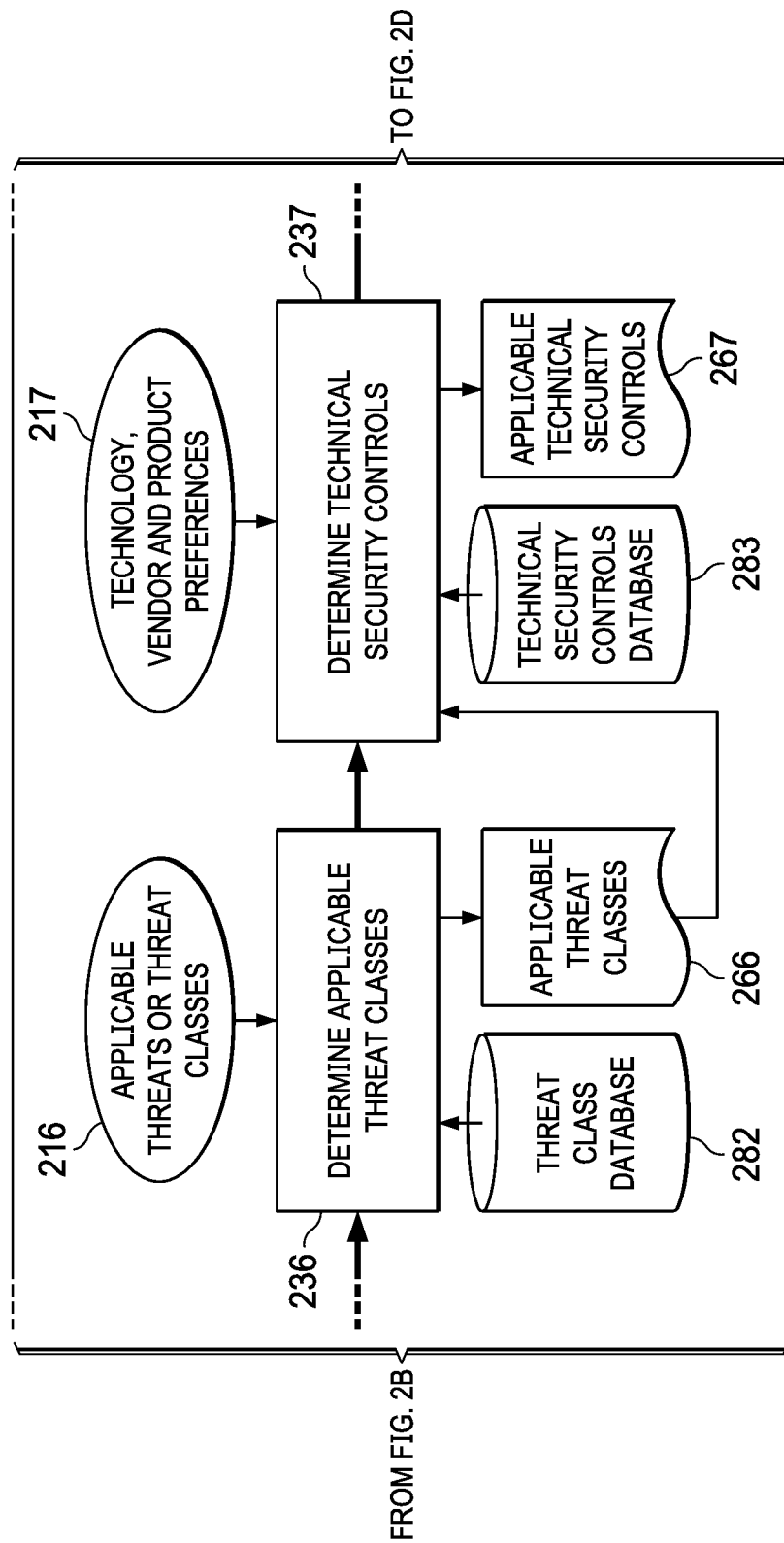
Figure 2D:
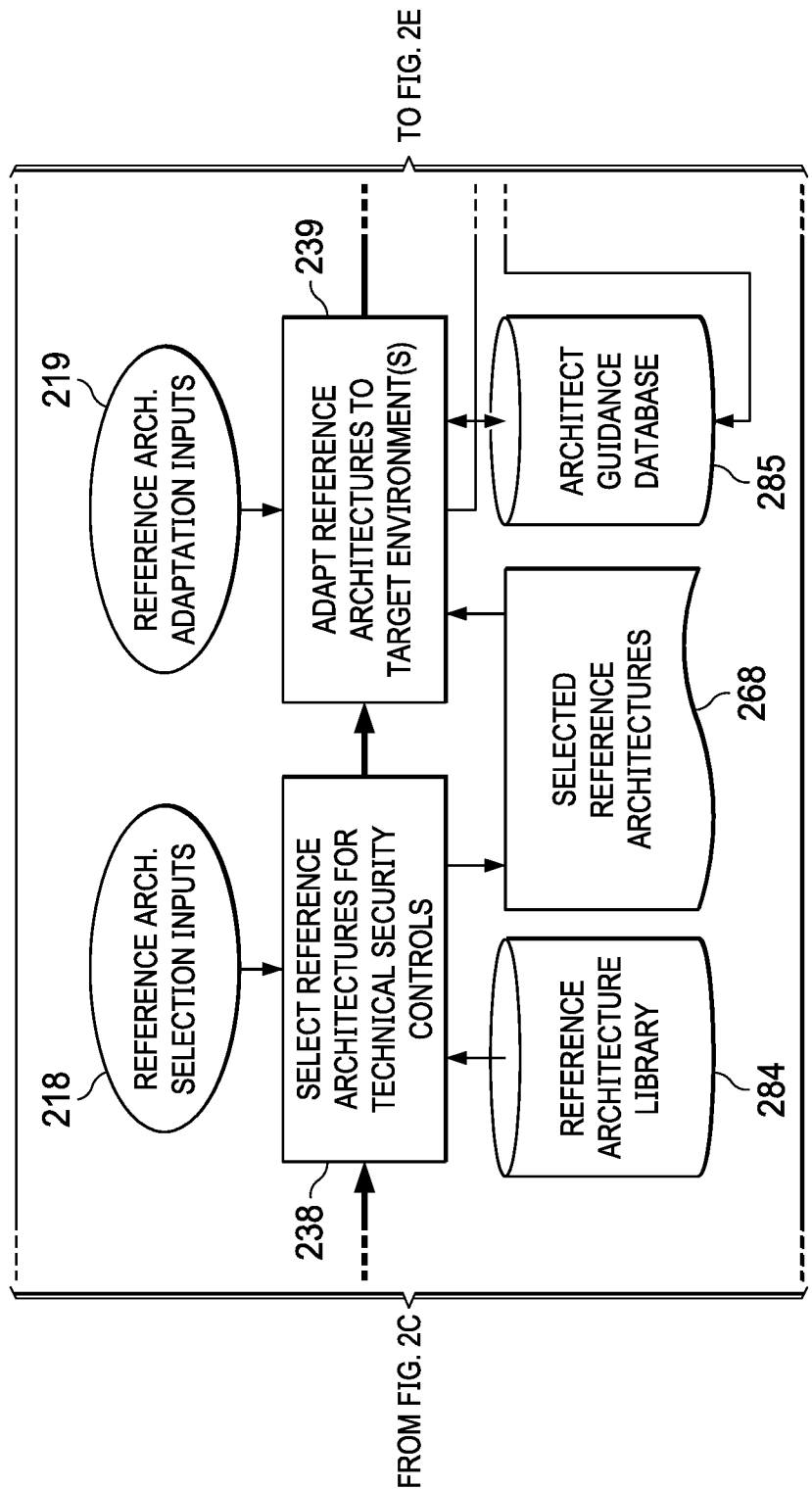
Figure 2E:
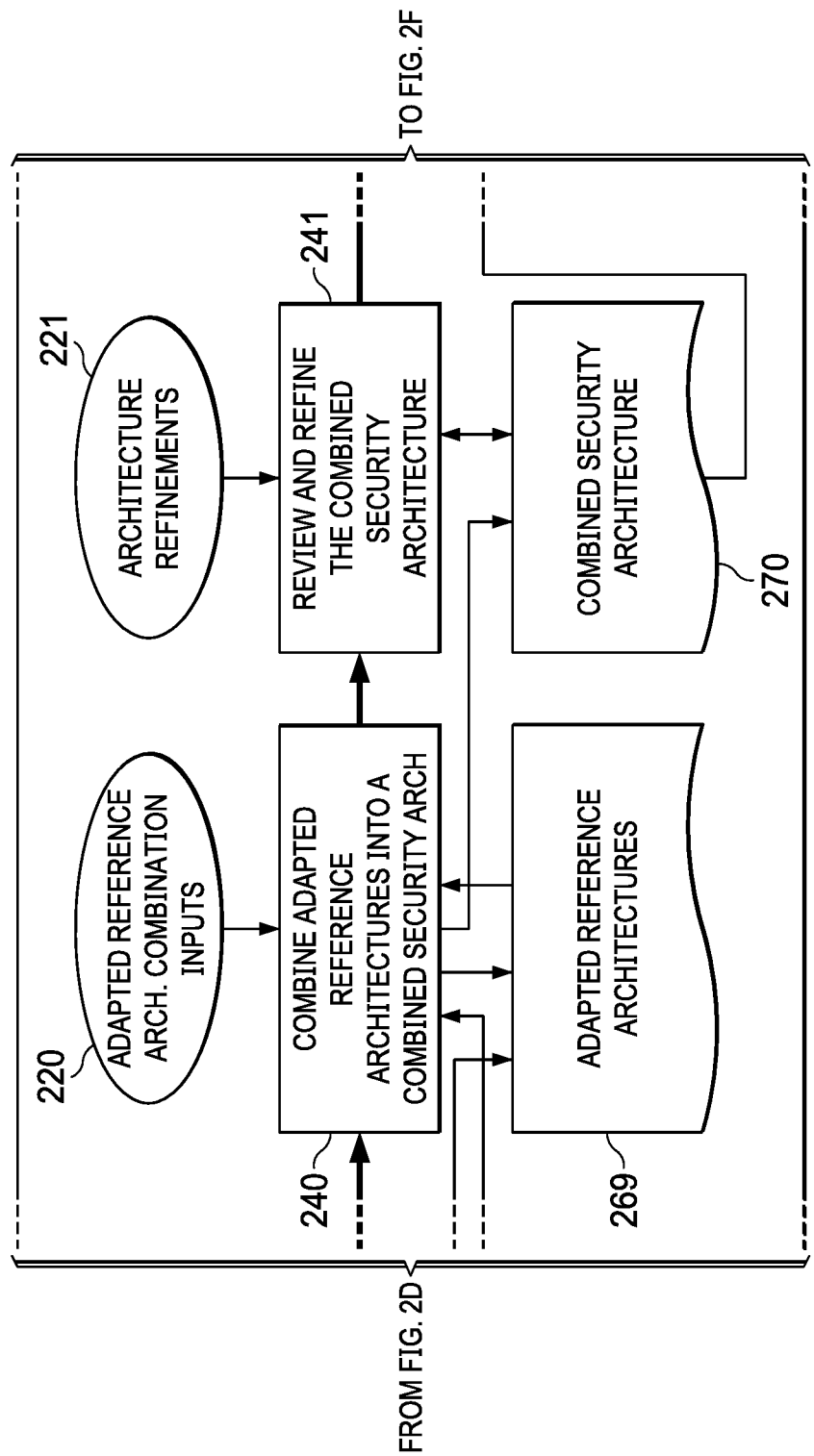
Figure 2F:
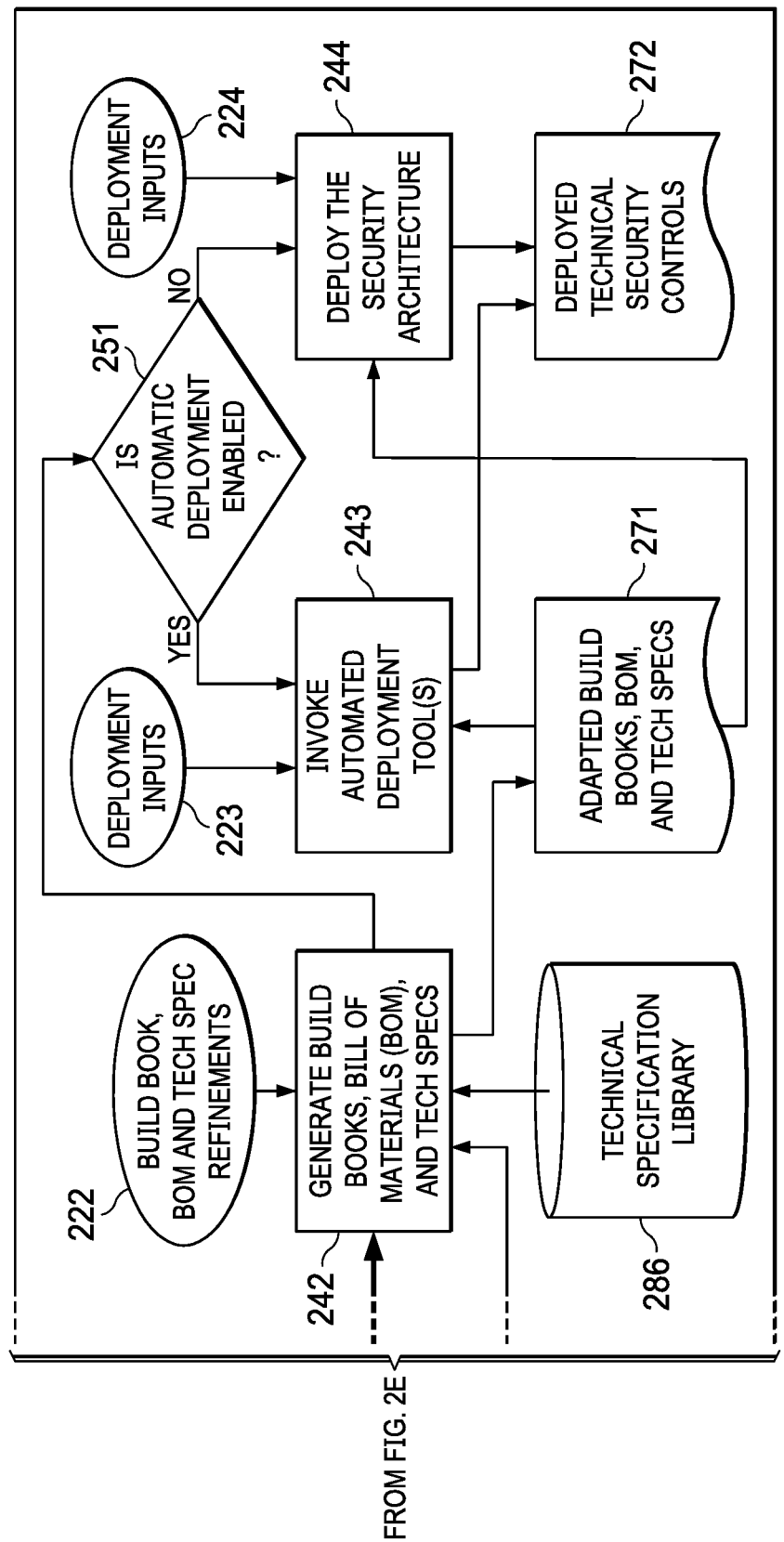

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A detailed description of systems and methods for automating security architecture formulation and deployment is presented herein. The systems and methods can be used for developing and deploying security architectures for existing data centers, new data centers, public and private clouds, and any combination of existing data centers, new data centers, and cloud. The systems and methods can comprehensively support security architecture formulation including the logical architecture, physical architecture, component architecture, and operational architecture.

Terms used herein are defined below:
Entity—a company, organization, institution, agency, etc.
Sub-entity—a subset of an entity (e.g., division, department, subsidiary, etc.). sub-entities can have their own sub-entities (subsets of the sub-entity), which can have their own sub-entities, etc.
Security architecture—the set of preventive, detective, and corrective technical controls for protecting an entity's computing infrastructure, applications, and information. The technical security controls are implemented in hardware, software, or firmware, and include configuration parameters.
Security sub-architecture—a subset of the security architecture for an entity. Security sub-architectures can have their own sub-architectures (subsets of the sub-architecture), which can have their own sub-architectures, etc.
Environment—data processing facilities, networks, hardware, software, firmware, and other equipment and components for an entity. An environment can include owned, leased, or licensed hardware (physical and/or virtual), software, and firmware in data centers, other sites, on-premise cloud, public cloud, etc.
Sub-environment—a subset of one or more environments (e.g., the hardware and software used for production). Sub-environments can have their own sub-environments (subsets of the sub-environment), which can have their own sub-environments, etc.

Zone—one or more subnets in an environment or sub-environment that are partially or fully isolated from other subnets.

Sub-zone—one or more subnets with a zone that are partially or fully isolated from other subnets within the zone. Sub-zones can have their own sub-zones, etc.

Component—hardware, software, firmware, and other equipment.

Sub-component—a subset of a component. sub-components can have their own sub-components, etc.

Threat class—a threat category or threat type comprising one or more individual threats. The threats in a threat class can be related in that they can be countered by one or more technical security controls or technical security sub-controls. For example, the threat class identity spoofing can encompass multiple methods of spoofing identity, all of which can be countered by the technical security control dual-factor authentication.

Threat sub-class—a subset of one or more threat classes. threat sub-classes can have their own threat sub-classes.

Technical security control—security equipment, hardware, software, or firmware that enforce one or more security policies or part of a security policy.

Technical security sub-control—security equipment, hardware, software, or firmware that is a subset of one or more technical security controls. Technical security sub-controls enforce a subset of one or more security policies or a portion of a security policy. For example, the technical security control perimeter protection can include technical security sub-controls perimeter packet filtering, perimeter deep content inspection, perimeter denial of service protection controls, perimeter data loss protection controls, email filtering controls, web security gateway, web application firewall, XML gateway, etc. Technical security sub-controls can have their own technical security sub-controls, etc.

Reference architecture—an architecture for one or more technical security controls or technical security sub-controls.

Reference sub-architecture—a subset of one or more reference architectures. reference sub-architectures can have their own reference sub-architectures, etc.

Adapted reference architecture—an adaption of a reference architecture for a target environment or sub-environment.

Adapted reference sub-architecture—an adaption of a reference sub-architecture for a target environment or sub-environment.

Project—the development of a security architecture for an entity.

Herein, unless otherwise indicated, the term entity refers to either entity or sub-entity, security architecture refers to either security architecture or security sub-architecture, environment refers to either environment or sub-environment, the term zone refers to either zone or sub-zone, the term component refers to either component or sub-component, the term threat class refers to either threat class or threat sub-class, the term technical security control refers to either technical security control or technical security sub-control, the term reference architecture refers to either reference architecture or reference sub-architecture, and the term adapted reference architecture refers to either adapted reference architecture or adapted reference sub-architecture.

With reference now to the figures, diagrams of illustrative embodiments of systems and methods for automating security architecture formulation are provided. It should be appreciated that the figures are only meant as examples and are not intended to assert or imply any limitation with regard to the environments in which different embodiments may be implemented. Many modifications to the depicted embodiments may be made.

FIG. 1 depicts a diagram illustrating an example of a security architecture factory in accordance with an illustrative embodiment. FIG. 1 provides an overview of security architecture factory 100, showing inputs, knowledge bases, and outputs. Security architecture factory 100 includes security architecture engine 101, which comprises processing logic that includes artificial intelligence methods, including learning and expert systems, for security architecture factory 100. Security architecture engine 101 receives one or more inputs that may include a description of a target environment 111; network zones and their attributes 112, which further describe the target environment; workloads, interfaces, and data sensitivity information 113; applicable threat classes 114; applicable security requirements, regulations standards, policies, and principles 115; existing technical security controls 116; and technology, vendor, and product preferences 117. Security architecture engine 101 may also receive inputs from a user of client device 121 and may input from or output to knowledge bases 131. In addition, security architecture engine 101 may generate a set of one or more outputs including security architecture 141; bills of materials 142; build book 143; and technical specification 144. Security architecture engine 101 may also optionally transmit all or part of the generated security architecture 141 to a deployment engine 151, a deployment system for automated deployment.

Knowledge bases 131 may include a plurality of different knowledge bases, such as, for example, a threat database, a threat class database, a security regulations and standards database, a technical security controls database, a reference architecture library, a technical specification library, and an architect guidance database. Knowledge bases 131 may be established and maintained by, for example, subject matter experts and may be subject to review, approval, update, and other life cycle management processes. In one illustrative embodiment, security architecture engine 101 automates the knowledge base life cycle management processes. Further, security architecture engine 101 may utilize knowledge bases 131 in the formulation and deployment of security architectures. Furthermore, knowledge bases 131 may capture knowledge of the subject matter experts and allow that knowledge to be applied to multiple projects and multiple entities. Moreover, security architecture engine 101 can accept guidance from a human user, such as a subject matter expert or architect, in the formulation of a security architecture, including guidance on adapting reference architectures and combining reference architectures and adapted reference architectures. Security architecture engine 101 may request user guidance when needed. Alternatively, a user may provide guidance without being requested by security architecture engine 101. Security architecture engine 101 can learn from the user guidance input, retaining the guidance in the architect guidance database, and apply that knowledge to other security architecture projects. A security architecture project is the development of a security architecture for an entity. An entity may be, for example, a company, organization, institution, agency, or the like. It should be noted that an entity may be comprised of sub-entities, such as, for example, divisions, departments, subsidiaries, and the like.

For each security architecture 141, security architecture engine 101 utilizes inputs 111-117 that may include a description of the target environment or environments, information regarding existing and new network zones and their attributes, workload descriptions with data sensitivities, applicable threat classes, applicable security requirements, regulations, standards, policies, and principles, existing technical security controls, and technology, vendor, and product preferences. A target environment may be, for example, a single information system, an information processing facility, network, hardware, software, firmware, other equipment and components, or any combination thereof, which correspond to an entity. A target environment may include owned, leased, or licensed hardware (e.g., physical and/or virtual), software, and firmware in data centers, other sites, on-premise cloud, public cloud, and the like. Herein, the description of the network zone architecture is considered part of the description of the target environment. It should be noted that a target environment may be a sub-environment. A sub-environment is a subset of an environment, such as, for example, hardware and software used only for production. A network zone represents one or more subnets within an environment or sub-environment that are partially or fully isolated from other subnets within the environment. A network zone may represent a sub-network zone. A sub-network zone is one or more subnets of a particular network zone that are partially or fully isolated from other subnets within that particular network zone. A threat class is a security threat category or security threat type comprising one or more individual security threats. Security threats in a threat class may be related in that the security threats can be countered, thwarted, or neutralized by one or more technical security controls or technical security sub-controls. For example, a threat class of identity spoofing can encompass multiple methods of spoofing identity, all of which can be countered by a technical security control of dual-factor authentication. It should be noted that a threat class may represent a threat sub-class. A threat sub-class is a subset of one or more threat classes.

In developing security architecture 141, security architecture engine 101 utilizes relevant inputs 111-117 and knowledge bases 131, with optional user guidance input via client device 121, to formulate and output security architecture 141 including technical security controls, configuration parameter settings, and supporting infrastructure services. A security architecture is a set of preventive, detective, and corrective technical security controls for protecting an entity's computing infrastructure, applications, and sensitive information. The technical security controls may be implemented in security equipment, hardware, software, firmware, or any combination thereof, and include configuration parameters, that enforce one or more security policies or part of a security policy. It should be noted that a security architecture may include one or more security sub-architectures for an entity. Also, a technical security control may represent one or more technical security sub-controls. A technical security sub-control is a subset of one or more technical security controls and may enforce a subset of one or more security policies or a portion of a security policy. For example, technical security control perimeter protection may include technical security sub-control perimeter packet filtering, perimeter deep content inspection, perimeter denial of service protection controls, perimeter data loss protection controls, email filtering controls, web security gateway, web application firewall, XML gateway, and the like.

Security architecture 141 can be an end-to-end security architecture or a specific security architecture for a specific purpose, such as, for example, countering specific security threats or threat classes or meeting specific security requirements, policies, regulations, or standards. Security architecture engine 101 may represent security architecture 141 using one or more methods and formats, which may include, for example, graphical, text, XML, JSON, command language, object, database, or a combination of these representation methods and formats.

Security architecture engine 101 may also output bill of materials 142, build book or books 143, technical specification or specifications 144 containing a description of the security configuration for components in the data processing system, and other artifacts. A component may be, for example, hardware, software, firmware, a combination of hardware, software, and firmware, a combination of hardware and software, a combination of hardware and firmware, a combination of software and firmware, or other equipment. It should be noted that a component may represent a sub-component. A sub-component is a subset of a component. Security architecture engine 101 may utilize outputs 141-144 to guide security architecture deployment. Alternatively, security architecture engine 101 may interface with deployment engine 151, a deployment system for automated deployment. Deployment engine 151 may be integral with or external to security architecture factory 100. In an alternative embodiment, there can be more than one deployment engine 151, each utilizing some security architecture factory 100 outputs. In alternative embodiments, deployment can be performed manually, deployment can be fully automated, or deployment can be performed using a combination of automated and manual deployment methods. Manual and automated deployment can use at least some of security architecture factory 100 outputs. Security architecture engine 101 may also utilize outputs 141-144 as documentation, for proposals, or for other purposes, such as assessing existing systems and education.

With reference now to FIGS. 2A-2F, a diagram illustrating an example of a security architecture factory automated process is depicted in accordance with an illustrative embodiment. FIGS. 2A-2F show processes, inputs, outputs, and knowledge bases of a security architecture factory, such as security architecture factory 100 in FIG. 1. Security architecture factory automated process 200 illustrates automated processing steps performed by a security architecture engine, such as security architecture engine 101 in FIG. 1, to formulate and deploy a full or partial security architecture for a target environment of a particular entity. The security architecture may be, for example, security architecture 141 in FIG. 1. The security architecture engine performs processing steps 231-244 (i.e., rectangular-shaped objects in the diagram). In addition, the security architecture engine utilizes inputs 211-224 (i.e., oval-shaped objects in the diagram) as inputs to processing steps 231-244. Outputs 261-272 (i.e., manuscript-shaped objects in the diagram) indicate outputs of processing steps 231-244. Knowledge bases 281-286 (i.e., disk-shaped objects in the diagram) may indicate inputs and/or outputs of processing steps 231-244. Outputs 261-272 may also be inputs to some of processing steps 231-244, although not completely shown in the example of FIGS. 2A-2F. The security architecture engine may store outputs 261-272 for consuming processes or interfaces or transmit outputs 261-272 to the consuming processes or interfaces. Step 251 (i.e., diamond-shaped object in the diagram) represents decision logic of the security architecture engine.

While processing steps 231-244 are shown in a particular order in this example, multiple alternative orderings are possible. For example, in an alternative illustrative embodiment processing step 234 (i.e., "define requirements, regulations, standards, policies, and principles") may follow processing step 236 (i.e., "determine applicable threat classes"), or some of the steps may be omitted.

In an illustrative embodiment, a user, such as, for example, a subject matter expert, system architect, security architect, or the like, may provide inputs 211-224. Alternatively, one or more other systems may provide inputs 211-224. In an illustrative embodiment, outputs 261-272 may be in, for example, electronic form, paper form, film form, other form, or any combination thereof. In an illustrative embodiment, the security architecture engine may store outputs 261-272 in one or more databases, files, or other forms of persistent storage. In an illustrative embodiment, the security architecture engine may designate stored information to be data for an entity. In an illustrative embodiment, the security architecture engine may designate stored information to be data for a security architecture project for an entity. In an illustrative embodiment, the security architecture engine may share stored information among security architecture projects for an entity. In an illustrative embodiment, the security architecture engine may utilize stored information for multiple security architecture projects or multiple entities. In an illustrative embodiment, the security architecture engine may pass information from one processing step to one or more other processing steps.

In an illustrative embodiment, knowledge bases contain stored information that may be used by multiple security architecture projects or multiple entities. In an illustrative embodiment, when the security architecture engine utilizes stored information in knowledge bases for multiple entities, the security architecture engine anonymizes the information so as to not disclose that information associated with an entity when the security architecture engine shares that information with another entity. In an illustrative embodiment, the security architecture engine may populate and maintain the knowledge bases through life cycle management processes that may include, for example, definition, review, approval, update, deletion, retirement, and the like.

In an illustrative embodiment, a processing step may receive no information, partial information, or complete information as input. An input may be incomplete when that particular input is not needed for a particular security architecture project. For example, if an objective of a security architecture project is to enhance client device endpoint security, then it may not be necessary to define the full enterprise infrastructure. Inputs may also be incomplete when the inputs are unknown. When inputs are incomplete or unknown, processing steps, which use those inputs, may include logic that can work with incomplete information or the processing steps can request the missing information needed for processing, or request guidance on processing or processing outputs.

In an illustrative embodiment, processing steps 231-244 may be implemented in software. In an illustrative embodiment, the software may be a web application, with processing steps 231-244 implemented in web pages accessed via a browser or other software running in a client device, and processing logic running in a server in a cloud or data center, storing information in databases, files, or other storage. In another illustrative embodiment, the software may comprise client device-based user interface software, server-based processing logic, and server-based storage. In another illustrative embodiment, the software may be an application running on one or more computers. In an illustrative embodiment, some inputs may be via electronic fillable forms or graphical user interfaces. In an illustrative embodiment, some inputs and outputs may be forms, tables, text, graphs, diagrams, pictures, or any combination thereof. In an illustrative embodiment, some inputs and outputs may be graphical network diagrams, for example.

Processing step 231 provides a capability to receive input 211 of a complete or partial description of a target environment or environments, including data processing facilities, networks, hardware, software, firmware, and other equipment and components. Processing step 231 processes input 211 and outputs the inputted information or outputs processed results, such as output 261 target environment or environments. A target environment may include, for example, owned, leased, or licensed hardware, software, firmware, components, and equipment in data centers, other sites, on-premise cloud, public cloud, and the like. The security architecture engine may request environment description inputs that are relevant to the security architecture or a portion of the security architecture associated with a particular project.

Processing step 232 provides a capability to receive input 212 of a complete or partial description of a network zone architecture for a target environment or sub-environment, including the network segments in a zone, and a description of inter-zone interfaces and interfacing equipment (e.g., firewalls and the like) or interfacing services (e.g., wide area networks and the like). Processing step 232 can also process input 212, and output the inputted information or processed results, such as output 262 zone architecture. A description of the zone architecture may include, for example, data sensitivity level, levels, or ranges processed or stored in a network zone. The description may also include allowed or denied data flows among zones or may provide rules for determining allowed or denied inter-zone data flows. Data flow rules may be based on, for example, specified network zones (e.g., Zone A can communicate with Zone B), network zone sensitivity levels, or on other network zone attributes. For example, inter-zone data flow rules can be determined based on the data sensitivity level or levels of each network zone with, for example, data flows permitted from a network zone of low sensitivity to a network zone of higher sensitivity, but not in the reverse direction, or in the reverse direction only with special technical security controls that restrict and/or monitor such data flows. Processing step 232 may also receive other descriptive information and attributes of the network zone or zones that may include subnets, network equipment (e.g., switches, routers, internal firewalls, etc.), physical attributes (e.g. available space, power, cooling, rack space, and the like), and existing or planned components within the zones (e.g., load balancers, proxies, terminal servers, remote access servers, database servers, directory servers, security components, system management components, other infrastructure services, etc.), and available servers or virtual servers in the zone for hosting reference architecture components.

Processing step 233 provides a capability to receive input 213 of a description of a workload or workloads and their target environment or sub-environment. Processing step 233 can also process input 213 and output the inputted information or processed results, such as output 263 workloads. A description of the workload may include, for example, workload functionality, interfaces, inputs, outputs, data sensitivities, components, network zones or zone types in which components currently reside or are to reside. The workload can be an existing workload currently running in an existing environment or sub-environment or a new workload that is to be fully or partially deployed to a new environment or sub-environment of a public cloud, on-premise cloud, or new data center, for example.

Processing step 234 provides a capability to receive input 214 of security requirements, which may include applicable regulations, standards, policies, principles, performance requirements, availability requirements, and the like. Processing step 234 can also process input 214 and output the inputted information or processed results, such as output 264 applicable security requirements. Processing step 234 may select security regulations and standards from one or more databases or lists, such as regulations and standards database 281. The security architecture engine can maintain or extend the databases or lists as needed. The security architecture engine can provide life cycle management of the databases or lists, including an ability to define initial entries, update the databases or lists, maintain versions, and add, delete, or retire entries, with associated approval processes.

Processing step 235 provides a capability to receive input 215 of existing technical security controls currently deployed in the existing environment or sub-environment. Processing step 235 can also process input 215 and output the inputted information or processed results, such as output 265 existing technical security controls.

Processing step 236 provides a capability to receive input 216 of applicable threats or threat classes. Processing step 236 may select the threat classes from a threat class database or list, such as threat class database 282. A threat class is a set of one or more known security threats. Threat classes may comprise threat sub-classes or individual security threats. The security architecture engine can group individual security threats into a threat class such that the threat class can be countered by one or more technical security controls. When individual security threats are input, the security architecture engine can suggest or determine a threat class or threat classes that contain the security threat, and, if more than one threat class contains the security threat, then the security architecture engine can allow a user, such as a subject matter expert or security architect, to decide which of the threat classes apply. Processing step 236 can also process input 216 and output the inputted information or processed results, such as output 266 applicable threat classes.

Processing step 237 provides a capability to determine the technical security controls needed to address or counter applicable threat classes 266 or to address applicable security regulations, standards, policies, or other security requirements. The logic in processing step 237 can utilize information in threat class database 282 and technical security controls database 283, as well as mappings or relationships maintained between threat classes and technical security controls, mappings between security regulations or standards and technical security controls, or mappings between security regulations or standards and threats or threat classes. The security architecture engine can maintain the mappings or relationships, providing a capability for the mappings or relationship to be defined, reviewed, updated, deleted, or retired, with necessary approvals. Input 217 to processing step 237 may include, for example, technology, vendor, and product preferences. The security architecture engine may utilize input 217 as additional selection criteria for the technical security controls. Processing step 237 can also output the inputted information or output processing results, such as output 264 applicable technical security controls.

Processing step 238 provides a capability to select reference architectures for the technical security controls. A reference architecture is a previously stored security architecture, which has been built and modified over time, for one or more technical security controls or technical security sub-controls. It should be noted that the reference architecture may represent a reference sub-architecture. A reference sub-architecture is a subset of one or more reference architectures. The logic in processing step 238 may utilize information in reference architecture library 284, as well as mappings or relationships between the technical security controls and reference architectures maintained in the knowledge bases. The security architecture engine can maintain reference architecture library 284 and the mapping or relationships, providing a capability for reference architecture library 284 and the mapping or relationships to be defined, stored, reviewed, updated, deleted, or retired, with necessary approvals. A user, such as a subject matter expert, can provide input 218 of reference architecture selections, including information needed to choose a reference architecture and preferences of one reference architecture over another, including technology, vendor, or product preferences. Processing step 238 can also output the inputted information or output processing results, such as output 268 selected reference architectures. In an alternative illustrative embodiment, reference architectures can be associated with threat classes, standards, or regulations and the security architecture engine can select reference architectures based on this association rather than by association with technical security controls.

Processing step 239 provides a capability to adapt selected reference architectures 268, which were previously selected in processing step 238, to the target environment or environments. An adapted reference architecture is an adaption of a reference architecture for a particular target environment or sub-environment. It should be noted that an adapted reference architecture may represent an adapted reference sub-architecture. An adapted reference sub-architecture is an adaption of a reference sub-architecture for a target environment or sub-environment. The security architecture engine can use methods for adapting reference architectures, such as the methods illustrated in the example of FIG. 7. Processing step 239 can also accept input 219 of reference architecture adaptations and guidance from a user, such as a subject matter expert or system architect, for adapting a reference architecture and refining an adapted reference architecture. The security architecture engine can maintain the user guidance in architect guidance database 285 for future use in adapting reference architectures or for refining reference architectures. Processing step 239 can also output the inputted information or output processing results, such as output 269 adapted reference architectures.

Processing step 240 provides a capability to combine reference architectures and adapted reference architectures into a combined security architecture for a target environment or sub-environment, when there are multiple security architectures to be combined for a security architecture project (e.g., for multiple technical security controls). The security architecture engine can use methods for combining reference architectures and adapted reference architectures. Processing step 240 can also accept input 220 of adapted reference architectures, and guidance from a user, such as a subject matter expert or system architect, for combining reference architectures and adapted reference architectures. The security architecture engine can maintain the user guidance in architect guidance database 285 for future use in combining reference architectures or for refining reference architectures. Processing step 240 can also output the inputted information or output processing results, such as output 270 combined security architecture. As in the embodiment depicted in FIGS. 2A-2F, when there is more than one selected reference architecture 268, selected reference architectures 268 may first be adapted for the target environment, and then combined. In another embodiment not depicted in FIGS. 2A-2F, when there is more than one selected reference architecture 268, the selected reference architectures 268 may first be combined, and then the combined selected reference architectures may be adapted for the target environment.

Processing step 241 provides a capability for a user, such as a subject matter expert or architect, to review adapted combined security architecture 270 and provide input 221 of architecture refinements. Processing step 241 can also process input 221 and output the inputted information or processed results.

Processing step 242 provides a capability to generate one or more build books, bills of materials, and technical specifications for an adapted security architecture or combined security architecture. Processing step 242 can also provide a capability to receive input 222 of build book, bill of materials, and technical specification refinements to produce one or more build books, and bills of materials, and technical specifications for a target environment. The security architecture engine can maintain this refinement information in reference architecture library 284 or another library. The security architecture engine can provide a capability to input and manage, within technical specification library 286, a technical specification for a component that may be used in one or more reference security architectures. Processing step 242 can adapt the build books, bills of materials, and technical specifications for an adapted or combined reference security architecture and provide output 271 adapted build books, bill of materials, and technical specifications for use in security architecture deployment. Processing step 242 may also provide a capability for a user, such as a subject matter expert, deployment expert, procurement expert, or architect, to review and refine an adapted build book, bill of materials, or technical specification.

At step 251 a determination is made as to whether the deployment of the technical security controls in the adapted and/or combined security architecture is automated or manual. If automatic deployment is enabled or selected, yes output of step 251, then processing step 243 invokes an automated deployment tool to deploy the technical security controls in the adapted or combined security architecture. Processing step 243 also provides a capability to receive deployment inputs 223. Automated deployment inputs 233 include the adapted or combined adapted reference architectures and the adapted build books, bills of materials, and technical specifications. If automatic deployment is not enabled or selected, no output of step 251, then processing step 244 allows manual deployment of the technical security controls in the adapted or combined security architecture. Processing step 244 also provides a capability to receive deployment inputs 224. Processing step 243 and processing step 244 provide output 272 deployed technical security controls, which includes the adapted or combined architecture, build book, bill of materials, and technical specification. For manual deployment, the adapted or combined security architecture and build book 269 or 270, bills of materials, and technical specifications 271 are used in processing step 244 by the personnel performing the deployment.

It should be noted that the security architecture engine may also assess an existing security architecture. For example, using processing steps 231-237, the security architecture engine can determine the needed technical security controls for comparison with the deployed technical security controls.

Figure 3A:
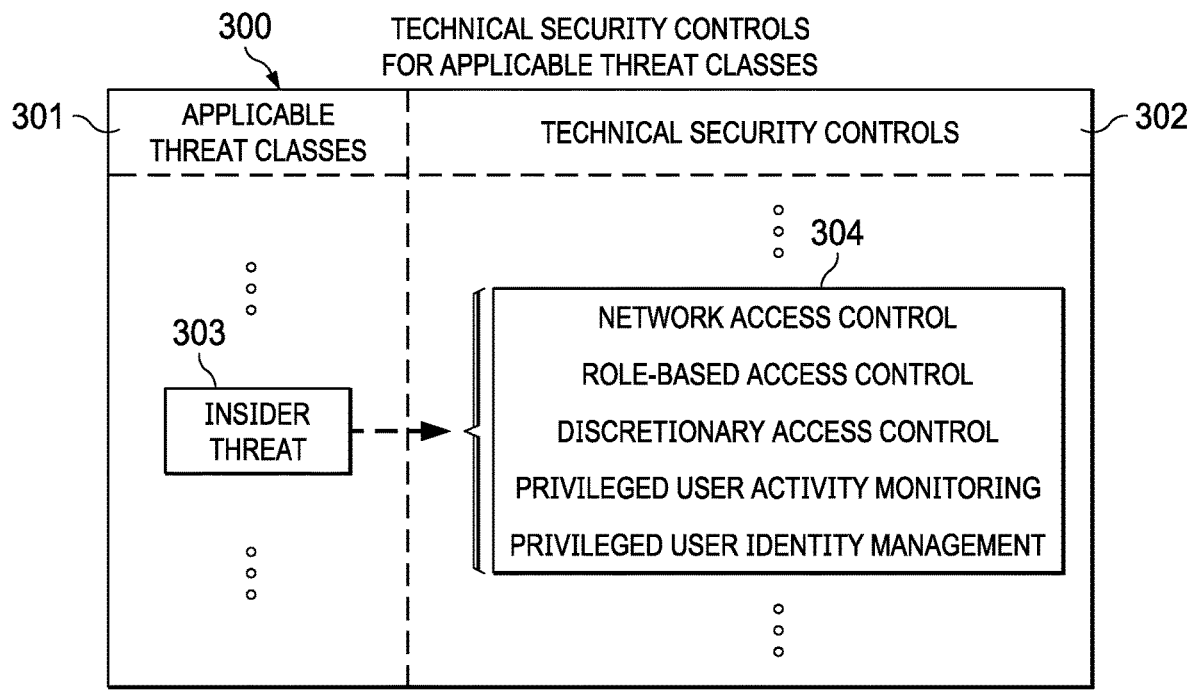
FIG. 3A is a diagram illustrating an example of determining technical security controls for applicable threat classes in accordance with an illustrative embodiment.

With reference now to FIG. 3A, a diagram illustrating an example of determining technical security controls for applicable threat classes is depicted in accordance with an illustrative embodiment. FIG. 3A illustrates technical security controls for applicable threat classes 300 as to how a security architecture engine, such as security architecture engine 101 in FIG. 1, determines a set of technical security controls from applicable threat classes. FIG. 3A is an example of determining necessary technical security controls 302 required to counter or address applicable threat classes 301 for a security architecture project. As discussed above, the security architecture engine can group related security threats into threat classes and security threats grouped into a particular threat class can be countered by the same set of one or more technical security controls.

Figure 3B:
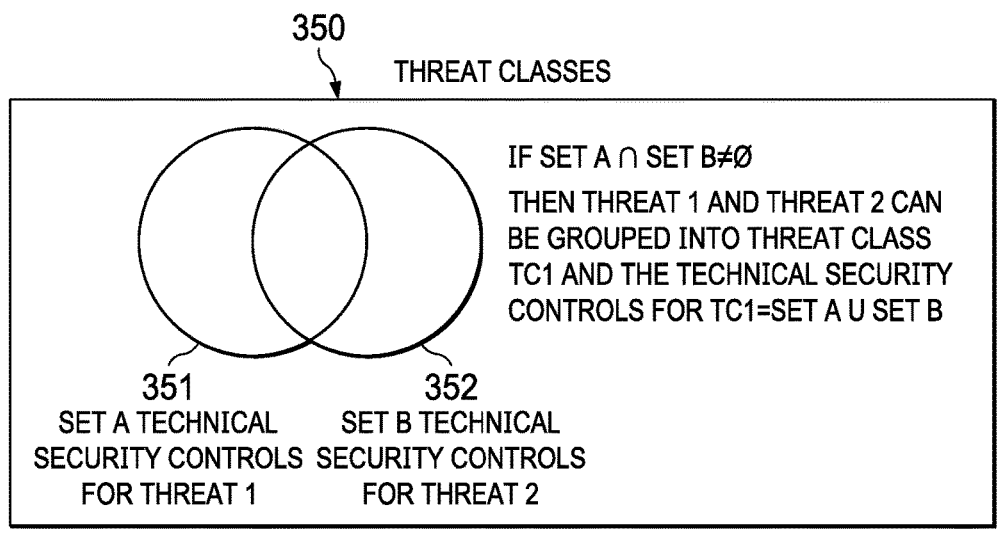
FIG. 3B is a diagram illustrating an example of threat classes in accordance with an illustrative embodiment.

With reference now to FIG. 3B, a diagram illustrating an example of threat classes is depicted in accordance with an illustrative embodiment. FIG. 3B shows threat classes 350. In this example, if threat 1 can be countered by set A technical security controls for threat 1 351 and threat 2 can be countered by set B technical security controls for threat 2 352, and set A and set B have a non-null intersection, then threats 1 and 2 can be within the same threat class, such as threat class "TC1", which can be countered by the union of the technical security controls in set A and set B. However, it should be noted that this example can be extended to more than two threats. For example, if threats 1, 2, and 3 can be countered by technical security controls sets A, B, and C, respectively, and either the intersection of sets A, B, C is non-null, or the intersection of sets A and B, intersection of sets B and C, and intersection of sets A and C are non-null, then threats 1, 2, and 3 can be grouped into the same threat class. Alternative to using threat classes, the security architecture engine can map each individual threat to one or more technical security controls that counter that particular threat. The use of threat classes rather than individual threats is advantageous in that it can be more efficient in formulation of a security architecture.

For example, a threat class for insider threats may include, for example, security threats posed by a privileged user accessing sensitive information on a server, a privileged user changing a device configuration to enable unauthorized access, and the like, all of which could be countered by the same set of security controls. Referring again to FIG. 3A as an illustration, "insider threat" 303 is countered by set of technical security controls 304, which in this example includes network access control, role-based access control, discretionary access control, privileged user activity monitoring, and privileged user identity management. This mapping or relationship between applicable threat classes 301 and technical security controls 302 can be defined by a user, such as a subject matter expert or architect, or through other methods. The security architecture engine can represent this mapping or relationship in a database, for example. In one illustrative embodiment, the database can be a relational database containing a table of threat classes, a table of technical security controls, and a table mapping threat classes in the threat class table to technical security controls in the technical security controls table.

Figure 4:
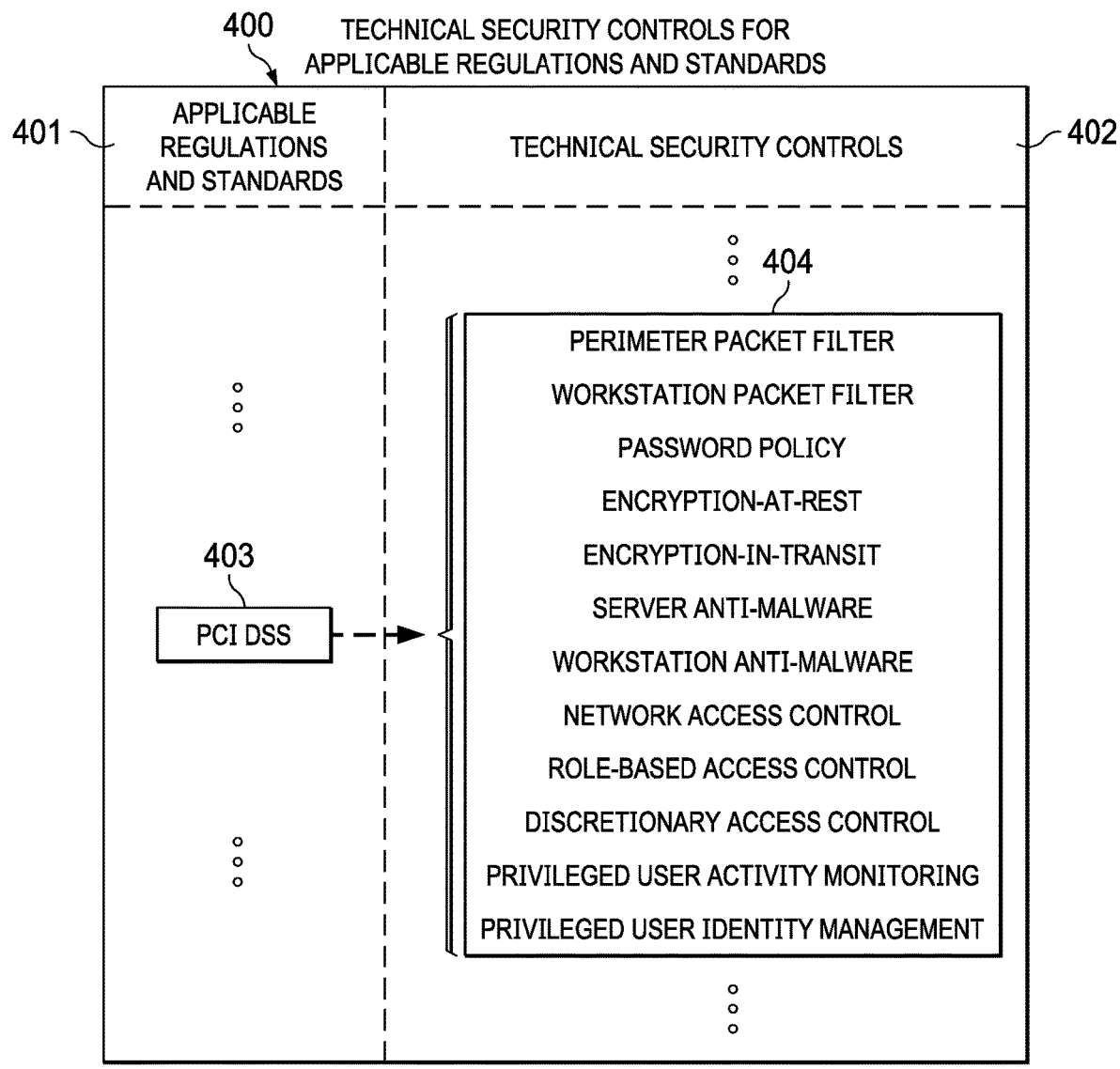
FIG. 4 is a diagram illustrating an example of determining technical security controls for applicable regulations and standards in accordance with an illustrative embodiment.

With reference now to FIG. 4, a diagram illustrating an example of determining technical security controls for applicable regulations and standards is depicted in accordance with an illustrative embodiment. FIG. 4 illustrates technical security controls for applicable regulations and standards 400 as to how a security architecture engine, such as security architecture engine 101 in FIG. 1, determines technical security controls from applicable regulations and standards. In other words, FIG. 4 shows a method for determining necessary technical security controls 402 required to satisfy security requirements in applicable regulations and standards 401 for a security architecture project.

In the specific example of FIG. 4, the security requirements for Payment Card Industry Data Security Standard (PCI DSS) 403 are satisfied by set of technical security controls 404, which include perimeter packet filter, workstation packet filter, password policy, encryption-at-rest, encryption-in-transit, server anti-malware, workstation anti-malware, network access control, role-based access control, discretionary access control, privileged user activity monitoring, and privileged user identity management. This mapping or relationship can be defined by a user, such as a subject matter expert or architect, or through other methods. The security architecture engine can represent this mapping or relationship in a database. In one illustrative embodiment, the database can be a relational database containing a table of security regulations and standards, a table of technical security controls, and a table mapping security regulations and standards in the regulations and standards table to technical security controls in the technical security controls table. In another illustrative embodiment, the security architecture engine can map security requirements in a regulation or standard to one or more threats or threat classes, which the security architecture engine then maps to technical security controls that counter the security threats and satisfy the security requirements in the regulation or standard. In another illustrative embodiment, regulations and standards can be in separate tables, each mapped to technical security controls or threats or threat classes.

Figure 5:
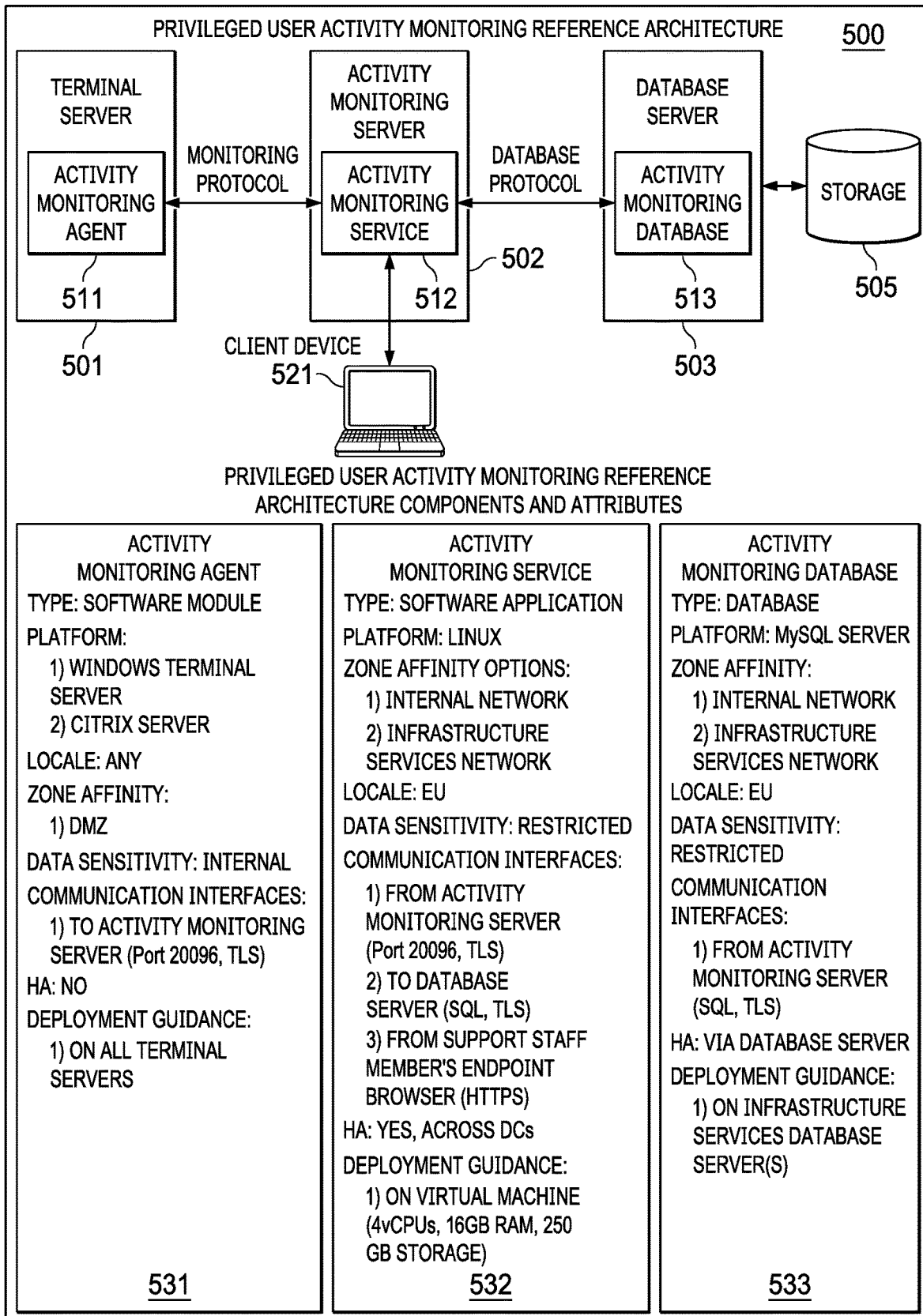
FIG. 5 is a diagram illustrating an example of a privileged user activity monitoring reference architecture in accordance with an illustrative embodiment.

With reference now to FIG. 5, a diagram illustrating an example of a privileged user activity monitoring reference architecture is depicted in accordance with an illustrative embodiment. FIG. 5 shows privileged user activity monitoring reference architecture 500. FIG. 5 illustrates an example of a reference security architecture for a privileged user activity monitoring technical security control. A security architecture factory, such as security architecture factory 100 in FIG. 1, includes a library of one or more reference architectures, each reference architecture covers one or more technical security controls. Reference architectures can be developed by users, such as subject matter experts or architects. Reference architectures may be generic or specialized for a technology, vendor, product, platform, infrastructure, environment, or tool set. Reference architectures can be single use or reusable, and can go through a review and approval process in the initial development and for updates, with life cycle management. The security architecture factory can provide input, storage, retrieval, update, upgrade, replacement, deletion, retirement, and the like (e.g., life cycle management) for reference architectures. The security architecture factory can maintain the reference architect in a machine-readable form, which may include unstructured text, structured text with defined syntax and semantics, object attributes and methods, vector graphics, raster graphics, markup language (e.g., XML or JSON), or any combination thereof. The security architecture factory can provide visualization and information entry and editing methods including, for example, graphical, forms, tables, reports, or any combination thereof.

In the example of FIG. 5, components of the reference architecture that implement a technical security control, and their interfaces, are displayed graphically with explanatory text. Each component can have one or more attributes and configuration parameters. The components can be, for example, networks, servers, virtual machines, network storage, network devices, physical appliances, virtual appliances, and the like. On servers and other components, software may run on bare machines or in virtual machines or other isolation technology (e.g., containers, mandatory access control, encryption, and the like). Components can have attributes, which may include, for example, type, platform, zone type affinity, locale, data sensitivity, communications interfaces, high assurance parameters, scaling parameters, deployment guidance, and the like. Components can also have security configuration parameter settings, such as password length, password complexity, access control parameters, hardening specifications, encryption-at-rest, encryption-in-transit, and the like. A reference architecture can comprise or include attributes and configuration parameters and their settings or values for any component or component type in a network zone or target environment. These attributes and configuration parameters may include, for example, firewall policies and rules, protocols for protection of internal or external communications (e.g., with TLS), protection of data at rest (e.g., with volume encryption, file encryption, or database encryption), allowed cryptographic algorithms, key sizes, and modes, encryption key management, password policy, hardening specifications, and the like. A reference architecture can also comprise or include network topology and routing rules (e.g., to force data flows through a security component, such as an intrusion detection/prevention component, data loss prevention component, web security component, email security component, or the like).

In this example, three components exist in the reference architecture: activity monitoring agent 511 having attributes 531 and residing in terminal server 501; activity monitoring service 512 having attributes 532 and residing in activity monitoring server 502; and activity monitoring database 513 having attributes 533 and residing in database server 503 with associated storage 505. Storage 505 may be a local storage or a network storage. Activity monitoring service 512 interfaces with client device 521, which is used by support personnel.

In an illustrative embodiment, a secure architecture engine, such as secure architecture engine 101 in FIG. 1, provides a capability to represent reference sub-architectures within a reference architecture. For example, a reference architect can include sub-architectures for the infrastructure required for a technical security control, technical security control agents or enforcement points, and technical security control management. Each sub-architecture can have its own attributes. For example, activity monitoring server 502 can be part of the infrastructure sub-architecture for the technical security control, that particular sub-architecture having a high availability attribute specifying that is it to be deployed redundantly, for example. The redundancy can be specified to be either within a single data center or cloud instance/account, or across data centers or cloud instances/accounts, or any combination thereof.

Figure 6:
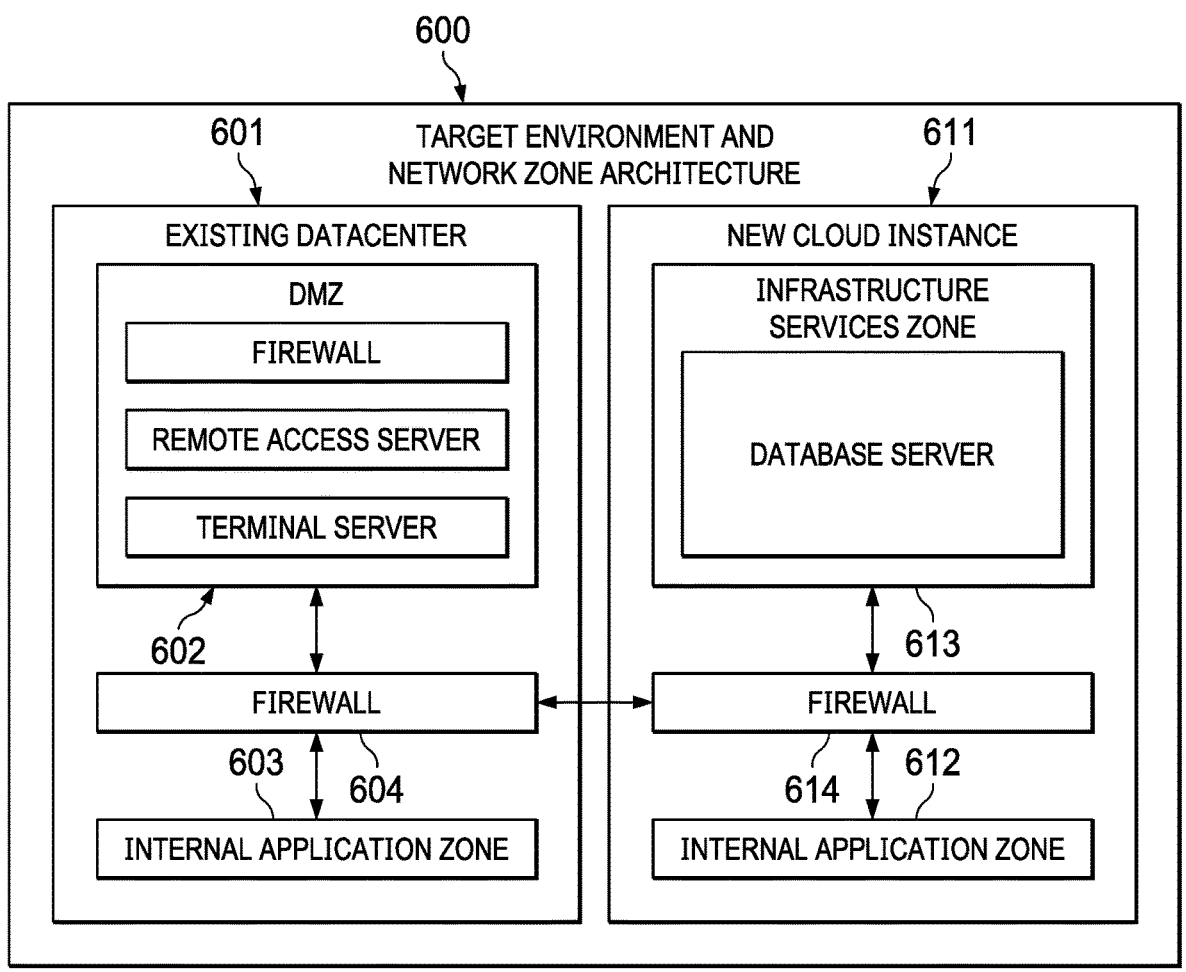
FIG. 6 is a diagram illustrating an example of a target environment and network zone architecture in accordance with an illustrative embodiment.

With reference now to FIG. 6, a diagram illustrating an example of a target environment and network zone architecture is depicted in accordance with an illustrative embodiment. FIG. 6 shows target environment and network zone architecture 600. However, it should be noted that target environment and network zone architecture 600 is intended as an example only and not as a limitation on illustrative embodiments. For example, target environment and network zone architecture 600 may comprise multiple sub-environments including any data centers, sites, on-premise clouds, or public clouds for an enterprise or organization.

In this example, two sub-environments exist: existing data center 601; and new cloud instance 611. Each sub-environment may contain one or more network zones or portions of network zones. In this example, existing data center 601 includes two network zones: demilitarized zone (DMZ) 602; and internal application zone 603. DMZ 602 is a network zone containing technical security controls for external interfaces. New Cloud Instance 611 also includes two zones: internal application zone 612; and infrastructure services zone 613. Each of the network zones may have attributes, such as, for example, name, type, locale, external interfaces, perimeter controls (e.g., firewalls, remote access servers, encryption devices, and the like), processing and storage components and their capabilities, data sensitivities, networks, and external interfaces, and special equipment (e.g., hardware security modules and the like). Also, firewalls 604 and 614 may exist between network zones. Within a network zone, compute equipment, such as servers, virtual servers, in-network storage, network devices, and the like, may be defined, and on a particular server or virtual server, the software stack can also be defined. Either a partial or full target environment definition can be provided to the security architecture engine. A partial definition may be used, for example, if not everything is known about the target environment. In an illustrative embodiment, a data processing system can have more than one target environment or sub-environment. For example, a data processing system may have a production environment, a pre-production environment, and a development environment.

Figure 7:
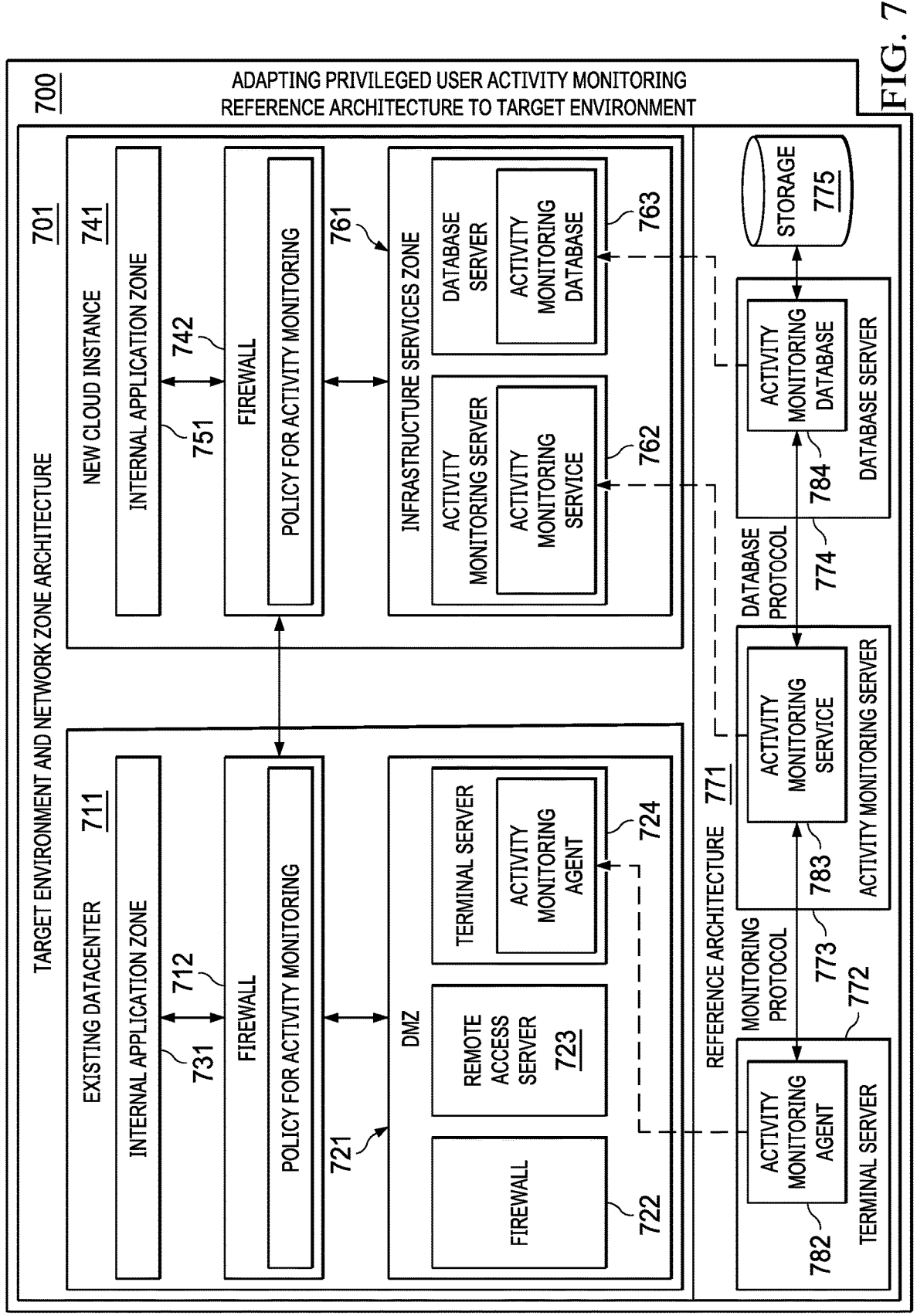
FIG. 7 is a diagram illustrating an example of adapting a reference architecture for privileged user activity monitoring to a target environment in accordance with an illustrative embodiment.

With reference now to FIG. 7, a diagram illustrating an example of adapting privileged user activity monitoring reference architecture to a target environment is depicted in accordance with an illustrative embodiment. FIG. 7 shows adapting privileged user activity monitoring reference architecture to target environment 700. Adapting privileged user activity monitoring reference architecture to target environment 700 illustrates the process of adapting a reference architecture for privileged user activity monitoring shown in the example of FIG. 5 to a target environment shown in the example of FIG. 6.

In this example, privileged user activity monitoring adapting reference architecture to target environment 700 includes target environment and network zone architecture 701 and reference architecture 771. Target environment and network zone architecture 701 includes existing data center 711 and new cloud instance 741. Existing data center 711 includes DMZ 721, internal application zone 731, and firewall 712. DMZ 721 includes firewall 722, remote access server 723, and terminal server 724. New cloud instance 741 includes internal application zone 751, infrastructure services zone 761, and firewall 742. Infrastructure services zone 761 includes activity monitoring server 762 and database server 763. Reference architecture 771 includes terminal server 772, activity monitoring server 773, database server 774, and storage 775.

In this example, a security architecture engine, such as security architecture engine 101 in FIG. 1, utilizes a zone type affinity attribute in the reference architecture to determine in which network zone a component of the reference architecture should be deployed. It also uses a component type affinity attribute to place selected components within components in the target environment. Although not shown FIG. 8, a component in the reference architecture may also have a component identifier affinity attribute that references a specific component in the target environment. Thus, using the component type affinity attribute, the security architecture engine adds activity monitoring agent 782, which resides in terminal server 772 of reference architecture 771 and has the component type affinity attribute value of "terminal server", to terminal server 724, which resides in DMZ 721 of existing data center 711. Further, the security architecture engine adds activity monitoring service 783, which resides in activity monitoring server 773 of reference architecture 771 and has the zone type affinity of "infrastructure services zone" and the component type affinity of "infrastructure services server", to infrastructure services zone 761 of new cloud instance 741. If there is an existing server or virtual server within infrastructure services zone 761 that the Activity Monitoring Service 783 can be deployed on, it will be used. Otherwise, activity monitoring server 762 or a virtual server can be added to infrastructure services zone 761. The security architecture engine also adds activity monitoring database 784, which resides in database server 774 and has the zone type affinity of "infrastructure services zone" and the component type affinity of "infrastructure services database server", to database server 763 in infrastructure services zone 761 of new cloud instance 741. If database server 763 does not exist within infrastructure services zone 761 of new cloud instance 741 that activity monitoring database 784 of reference architecture 771 can be deployed on, then database server 763 can be added to infrastructure services zone 761 with storage 775, which can be local or network storage. In addition, using a component interface description in the reference architecture, the security architecture engine can define the policies for the inter-zone/inter-site firewalls 712 and 742 of existing data center 711 and new cloud instance 741, respectively, to allow for activity monitoring flows. However, it should be noted that there may be multiple affected firewalls, including host firewalls or physical or virtual firewalls, for which the security architecture engine can determine and output the needed policy changes. In an illustrative embodiment, the security architecture engine can output the firewall policy changes in human-readable form. In another illustrative embodiment, the security architecture engine can directly feed a firewall configuration tool via the tool's API (e.g., in an XML or JSON representation transferred or transmitted to the tool using a defined interface or protocol).

In an illustrative embodiment, the security architecture engine provides a capability to collect additional inputs, including security policies, principles, controls, and other information, to be used in the formulation of the security architecture for the target environment. These additional inputs may include inputs from a user, such as a subject matter expert or architect. In one illustrative embodiment, a user can provide guidance in the reference architecture adaption (e.g., where there are ambiguities, multiple solutions, or missing or incomplete information). In an illustrative embodiment, an architect can resolve architecture adaptation ambiguities, for example, if there is more than one network zone in the target environment of the same type (e.g., internal application zone 731 of existing data center 711 is the same network zone type as internal application zone 751 of new cloud instance 741 in FIG. 7). In another illustrative embodiment, the security architecture engine may request needed inputs from an architect. In another illustrative embodiment, a user can provide overarching policies or principles.

In an illustrative embodiment, the security architecture engine provides a capability to indicate that a component in a reference architecture is to be deployed in a high availability configuration. This can include an indication that a high availability method is to be used. For example, a component with a high availability attribute can be deployed redundantly in the same data center, redundantly in different data centers (e.g., active and backup data centers/clouds), or using another high availability method.

In an illustrative embodiment, the security architecture engine provides a capability to indicate methods for performance scaling of a component or components in a reference architecture, with associated performance parameters. These associated performance parameters can include an indication of the scaling method to be used. Example scaling methods can include, for example, horizontally scaling a component in a single data center or in multiple data centers (e.g., active and backup data centers/clouds), scaling platform hardware, or other scaling methods. The security architecture engine may include an ability to define load balancers in the target environment that can be used to horizontally scale a component in a reference architecture, with parameters indicating for what such load balancers can be used. The security architecture engine may also determine that additional load balancers need to be deployed to support horizontal scaling of a component if there is no existing load balancer that can be used, for example.

In an illustrative embodiment, the security architecture engine provides a capability for defining a security policy or policies that can be used in selecting or adapting reference architectures. In an illustrative embodiment, the security architecture engine provides a capability to specify configuration parameters to be used with a reference architecture. In an illustrative embodiment, the security architecture engine provides a capability for a network security policy to be defined that specifies allowed and prohibited traffic flows between network zones or subnets.

In an illustrative embodiment, a network security policy can include assigning sensitivity levels to network zones or subnets and defining the allowed and/or prohibited flows among sensitivity levels. The security architecture engine may also compare network zone or subnet sensitivity in the target environment with a component's data sensitivity defined in the reference architecture or via other inputs to ensure that a component is deployed in network zones with appropriate sensitivity levels for the component per the security policy.

In an illustrative embodiment, a security policy may include an ability to indicate that a component in a reference architecture is to be deployed in a specific network path (e.g., on all flows to or from the Internet). This can include the ability to specify that a network path must be used and cannot be bypassed. This can also include the ability to specify that traffic to or from specific networks must go through specific components (e.g., communications to the Internet must go through a web proxy).

In an illustrative embodiment, the security architecture engine may determine whether network topology, routing, and traffic filtering in a target environment or environments meet security requirements, and, if not, can output the changes required to networking components for meeting the security requirements. In an illustrative embodiment, an overarching policy may be defined for a system or subsystem requiring TLS protection of inter-component traffic. Further, the overarching policy may include configuration parameters for TLS, including allowed algorithms, modes, key sizes, and peer authentication methods, such as digital certificates.

In an illustrative embodiment, a password policy (e.g., password complexity, password length, password maximum lifetime, and the like) may be specified for a system, a subset of a system (e.g., domain), a specific server type or server, a specific hypervisor type or hypervisor, a specific operating system type or operating system instance, a specific middleware product or middleware product instance, a specific application type or application instance, a specific network device type or network device instance, a specific network storage type or network storage instance, and the like.

In an illustrative embodiment, a requirement to use a hardware security module for secure storage of cryptographic keys can be specified. In an illustrative embodiment, for a web server, prohibiting viewing of a website in an iFrame can be specified in order to prevent clickjacking attacks, or requiring all web site transmissions to be protected with TLS (HTTPS) can be specified.

In an illustrative embodiment, the security architecture engine may perform selection of reference architectures, the adaptation of reference architectures to the target environment, or the combination of reference architectures or adapted reference architectures, in order to meet specific criteria or constraints, including, for example, equipment cost, deployment cost, deployment time, complexity, power requirements, rack space requirements, longevity, performance, scalability, available capabilities and resources, preferred technologies, products, or vendors, target environment or site preference (e.g., cloud vs. on-premise data center, one data center vs. another, locale, and the like), existing systems or components, and external interfaces, policies, principles, standards, and the like.

In an illustrative embodiment, the security architecture engine may adapt a reference architecture for deployment to one or more sub-environments, for example, a production environment, pre-production environment, test environment. Adaptation may differ among different environments. For example, high availability may be applicable to a production environment, but not to a pre-production or development environment. As another example, application scanning components may apply only to a development environment.

In an illustrative embodiment, the security architecture engine provides a capability to combine reference architectures or adapted reference architectures. As an example, this combining can include removal of redundancies, for example, when a TLS proxy may be included in the reference architectures for multiple technical security controls (e.g., a TLS proxy for a network data leakage prevention component and a web security gateway). In an illustrative embodiment, the combining can be of the reference architectures prior to adaptation to the target environment or environments. In another illustrative embodiment, the combining can be of the adapted reference architectures. In an illustrative embodiment, the combining can also involve participation by a user, such as a subject matter expert or architect, for example, to provide architectural direction or guidance, make architectural decisions, make architectural refinements, and the like. The security architecture factory can include any combination of the aforementioned reference architecture adaptation or combination methods, or a subset or superset thereof.

In an illustrative embodiment, the security architecture engine may identify adapted or combined architectures that are affected by reference architecture changes, and changes to security regulations, standards, and threats. In an illustrative embodiment, when a reference architecture is changed, the security architecture engine may automatically determine previously adapted or combined architectures for projects that may be affected by the change, notify one or more users responsibility for the projects that the adapted and combined reference architectures need to be changed, and, if a user agrees, update the adapted and combined reference architectures for the users' project derived from the changed reference architecture. In an illustrative embodiment, when a mapping of threat class to technical security controls is changed, the security architecture engine may automatically determine the affected adapted or combined architectures for projects that may be affected by the change, notify one or more users responsibility for the projects that the adapted and combined reference architectures need to be changed, and, if a user agrees, update the adapted and combined reference architectures for the users' project derived from the changed reference architecture. In an illustrative embodiment, when a mapping of regulation to technical security controls is changed, the security architecture engine may automatically determine the affected adapted or combined architectures for projects that may be affected by the change, notify one or more users responsibility for the projects that the adapted and combined reference architectures need to be changed, and, if a user agrees, update the adapted and combined reference architectures for the users' project derived from the changed reference architecture. In an illustrative embodiment, the security architecture engine may utilize guidance from a user, such as a subject matter expert or architect, when making such updates. The security architecture engine may also request such guidance when needed.

In an illustrative embodiment, the security architecture engine provides a capability to upgrade a security architecture for a project when inputs to processing steps, such as, for example, processing steps 231-244 in FIGS. 2A-2F, change. In an illustrative embodiment, the security architecture engine may maintain a record of changes to a security architecture for a project. In an illustrative embodiment, the security architecture engine may also maintain versions of reference architectures, adapted reference architectures, and combined reference architectures. In an illustrative embodiment, the security architecture engine may track and/or show changes between versions.

Figure 8:
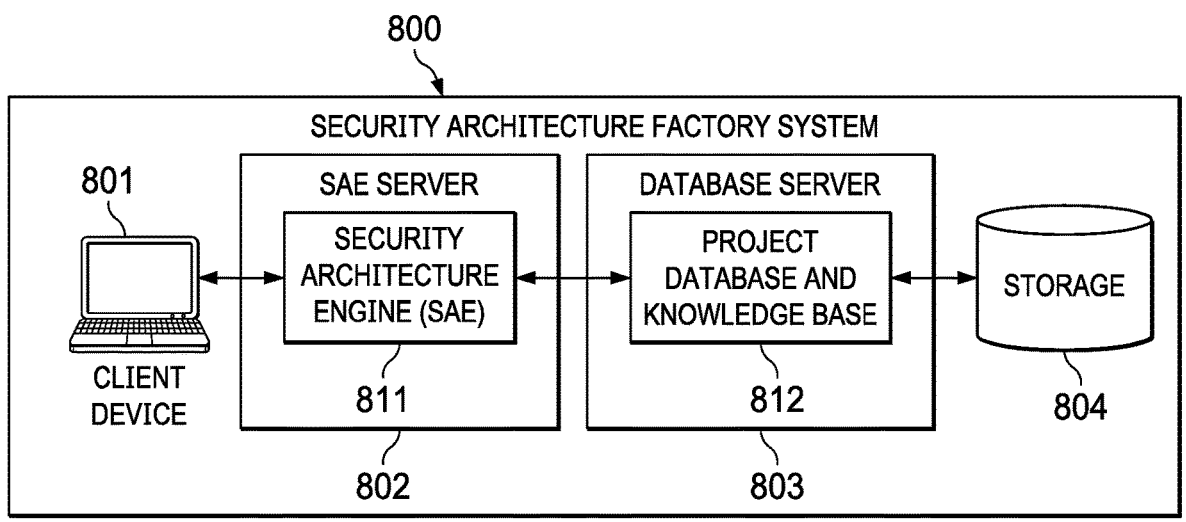
FIG. 8 is a diagram illustrating a network of data processing systems in which illustrative embodiments may be implemented.

With reference now to FIG. 8, a diagram illustrating a network of data processing systems is depicted in which illustrative embodiments may be implemented. FIG. 8 depicts security architecture factory system 800, using a client-server architecture. Using client device 801, a user, such as a subject matter expert or architect, may interface with security architecture engine server 802 on which security architecture engine 811 resides. Client device 801 may interface with security architecture engine server 802 via a network or client device 801 may be locally attached to security architecture engine server 802. Client device 801 may run a security architecture engine client application, which may be, for example, a browser or other software.

Security architecture engine 811 interfaces via a network with database server 803 on which project database and knowledge base 812 resides. Database server 803 stores information on storage 804, which may be local storage or network storage. Other components may exist in security architecture factory system 800, such as network switches, routers, firewalls, and other network security, computing, and storage components not shown in the diagram. Each of security architecture engine server 802 and database server 803 comprises one or more processors, memory, and storage devices, and may be virtualized. In another illustrative embodiment, security architecture engine 811 and project database and knowledge base 812 may reside on the same server or virtual server. In another illustrative embodiment, security architecture engine server 802 may be horizontally scaled and front-ended by a load balancer. In another illustrative embodiment, database server 803 may be replicated to another database server. In another illustrative embodiment, there may be separate database servers for the project database and knowledge base.

Figure 9:
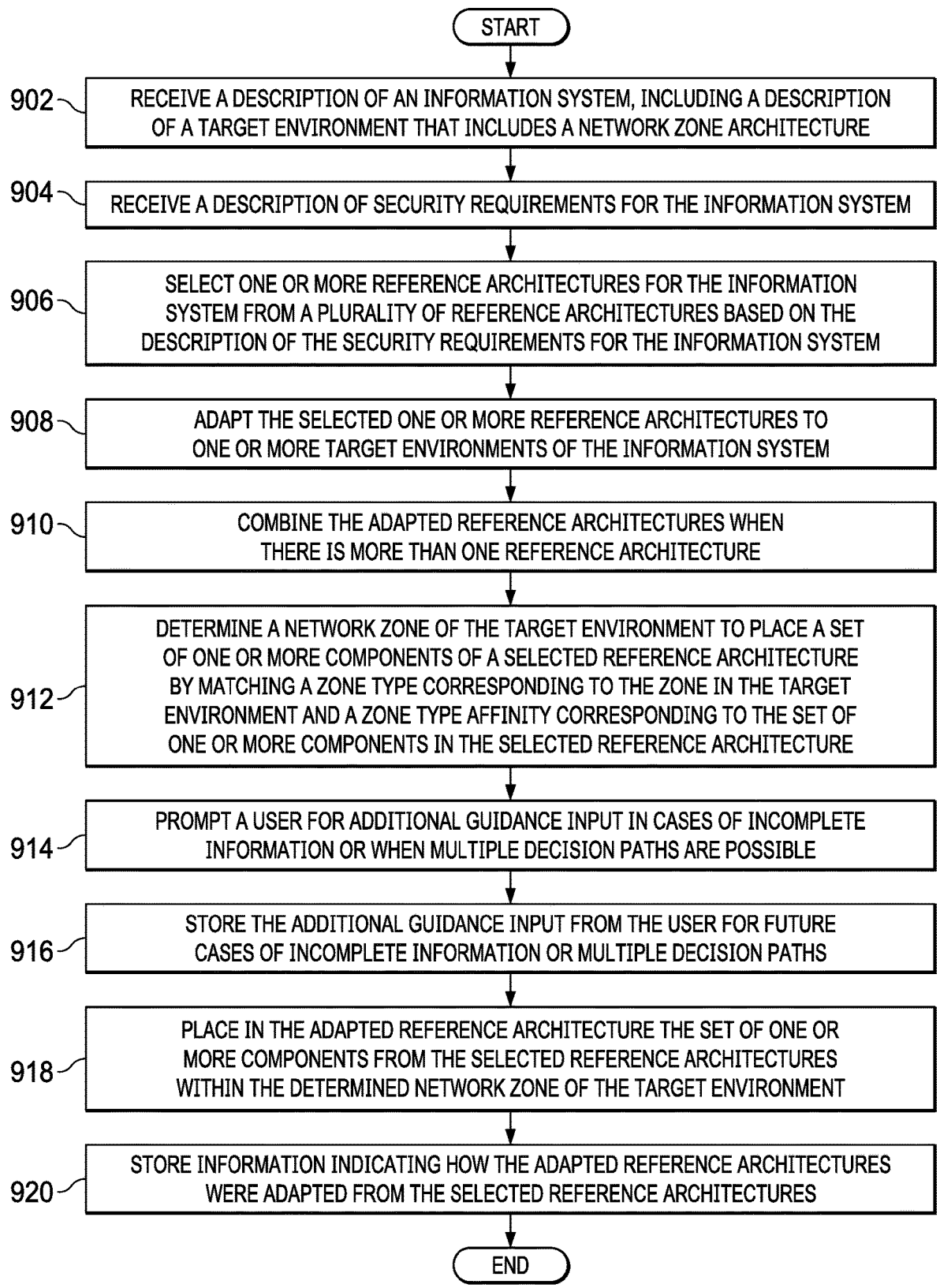
FIG. 9 is a flowchart illustrating a process for formulating a security architecture for an information system in accordance with an illustrative embodiment.

With reference now to FIG. 9, a flowchart illustrating a process for formulating a security architecture for an information system is shown in accordance with an illustrative embodiment. The process shown in FIG. 9 may be implemented in a computer, such as, for example, security architecture engine server 802 in FIG. 8. Also, it should be noted that not all methods and not all combinations of methods are covered (e.g., combining reference architectures prior to adapting).

The process begins when the computer receives a description of an information system (step 902). The description includes a description of a target environment, which includes a network zone architecture. The information system may be any type of information processing system. The computer also receives a description of security requirements for the information system (step 904).

The computer selects one or more reference architectures for the information system from a plurality of reference architectures based on the description of the security requirements for the information system (step 906). The computer adapts the selected one or more reference architectures to one or more target environments of the information system (step 908). The one or more target environments of the information system may include, for example, a preproduction environment, a production environment, a test environment, and the like. The computer combines the adapted reference architectures when there is more than one reference architecture (step 910). The computer removes redundancies when combining the adapted reference architectures and requests user guidance when needed. However, it should be noted that in an alternative illustrative embodiment the computer may combine reference security architectures prior to adaptation, removing redundancies when combining reference security architectures and requesting user guidance when needed.

In addition, the computer determines a network zone of the target environment to place a set of one or more components of a selected reference architecture by matching a zone type corresponding to the network zone in the target environment and a zone type affinity corresponding to the set of one or more components in the selected reference architecture (step 912). Further, the computer prompts a user for additional guidance input in cases of incomplete information or when multiple decision paths are possible (step 914). The computer stores the additional guidance input from the user for future cases of incomplete information or multiple decision paths (step 916).

The computer places in the adapted reference architecture the set of one or more components from the selected reference architectures within the target environment network zone determined in steps 912 and 914 (step 918). The computer stores information indicating how the adapted reference architectures were adapted from the selected reference architectures (step 920). Thereafter, the process terminates.

With reference now to FIG. 10, a flowchart illustrating a process for formulating a security architecture is shown in accordance with an illustrative embodiment. The process shown in FIG. 10 may be implemented in a computer, such as, for example, security architecture engine server 802 in FIG. 8. Also, it should be noted that not all steps need to be performed.

The process begins when the computer groups security threats into a set of threat classes (step 1002). The computer also maps each threat class to technical security controls (step 1004). In addition, the compute maps regulations and standards to the technical security controls (step 1006). Further, as an alternative to step 1004, the computer may map the regulations and standards to threat classes in the set of threat classes (step 1008). Furthermore, the computer maps the technical security controls to reference architectures (step 1010). Moreover, as an alternative to steps 1004, 1006, 1008, and 1010, the computer may map the set of threat classes and the regulations and standards to the reference architectures (step 1012).

The computer uses defined policies to select and adapt the reference security architectures (step 1014). The computer also uses guidance from a subject matter expert user when needed to adapt the reference architectures (step 1016). The computer places a component of a reference architecture in a network zone of a target environment based on a zone type of the network zone and a zone type affinity of the component (step 1018). The computer performs performance scaling of the component (step 1020).

Further, the computer defines security configuration parameter settings for the reference architectures based on one or more of applicable security requirements, threats, threat classes, regulations, standards, and security policies (step 1022). The computer adapts the reference architectures to one or more sub-environments of the target environment (step 1024). Furthermore, the computer maintains a set of knowledge bases over their life cycle (step 1026). Moreover, when a reference security architecture changes, the computer automatically updates adapted and combined reference architectures for security architecture development projects that use the reference architecture (step 1028). Thereafter, the process terminates.

Thus, illustrative embodiments of the present invention provide a computer-implemented method, computer system, and computer program product for automatic security architecture formulation and deployment. Illustrative embodiments develop and deploy security architectures for existing data centers, new data centers, public and private clouds, and any combination of existing data centers, new data centers, and clouds (e.g., both public and private). Illustrative embodiments apply artificial intelligence technologies, which may include learning, reasoning, knowledge representation, and problem solving, to partially or fully automate the formulation of security architectures and their deployment.

Thus, illustrative embodiments provide one or more technical solutions that overcome a technical problem with how to automatically formulate and deploy security architectures to address security threats and requirements for a particular target environment or sub-environment. As a result, these one or more technical solutions provide a technical effect and practical application in the field of network security.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for formulating a security architecture for an information system, the method comprising:
    receiving a description of a target environment of the information system, the description including a network zone architecture;
    receiving a description of one or more security requirements for the information system;
    selecting one or more reference architectures for the information system from a plurality of reference architectures based on the description of the one or more security requirements for the information system;
    adapting one or more selected reference architectures to produce one or more adapted reference architectures for the target environment; and
    updating an adapted reference architecture when a corresponding reference architecture in a knowledge base changes.

2. The method of claim 1 further comprising at least one of:
    deploying the one or more adapted reference architectures in the target environment; and
    outputting a description of the adapted reference architectures.

3. The method of claim 1, wherein, when there is more than one selected reference architecture, the adapting of the one or more selected reference architectures further comprises at least one of:
    combining the selected reference architectures and adapting the combined reference architectures for the target environment; and
    adapting one or more selected reference architectures and combining the adapted reference architectures for the target environment.

4. The method of claim 1, wherein the receiving of the description of the one or more security requirements for the information system further comprises at least one of:
    receiving one or more applicable threats for the information system;
    receiving one or more applicable threat classes for the information system;
    receiving one or more applicable regulations for the information system; and
    receiving one or more applicable standards for the information system.

5. The method of claim 4 further comprising at least one of:
    mapping one or more of the received one or more applicable threats, one or more of the applicable threat classes, one of more applicable regulations, and one or more of the applicable standards to at least one of one or more technical security controls and one or more reference architectures, mapping one or more of the one or more technical security controls to one or more reference architectures to form one or more mapped reference architectures, and selecting one or more reference architectures from the one or more mapped reference architectures; and
    mapping one or more of the received one or more applicable threats, one or more of the applicable threat classes, one of more applicable regulations, and one or more of the applicable standards to at least one of one or more reference architectures to form one or more mapped reference architectures, and selecting one or more reference architectures from the one or more mapped reference architectures.

6. The method of claim 4, wherein an applicable threat class comprises one or more threats, each of which is mapped to a set of technical security controls where an intersection of sets of technical security controls is not null.

7. The method of claim 1, wherein the selecting of the one or more reference architectures further comprises:
receiving guidance from a user on at least one of selecting and adapting the one or more reference architectures; and
using the received guidance in at least one of the selecting and the adapting of the one or more reference architectures.

8. The method of claim 1 further comprising:
associating at least one of a zone type and a zone identifier with a zone in the target environment;
associating at least one of a zone type affinity and a zone identifier affinity with a component in a selected reference architecture; and
placing the component from the selected reference architecture in a network zone in an adapted reference architecture for the target environment where at least one of the zone type affinity associated with the component in the selected reference architecture matches the zone type associated with the zone in the target environment, and the zone identifier affinity associated with the component in the selected reference architecture matches the zone identifier associated with the zone in the target environment.

9. The method of claim 1 further comprising:
associating a component in a selected reference architecture with at least one of a network path between two or more zones in the information system, and a network path between the information system and an external entity external to the information system;
placing the component from the selected reference architecture in an adapted reference architecture for the target environment such that the component is in the network path; and
determining a network architecture for the target environment that prevents the component from being bypassed when information is communicated between the two or more zones or between the information system and the external entity.

10. The method of claim 1 further comprising:
receiving, in the description of the target environment, a description of a first component including at least one of a component type and a component identifier;
associating at least one of a component type affinity and a component identifier affinity with a second component in a selected reference architecture; and
placing the second component from the selected reference architecture within the first component in the target environment when at least one of the component type affinity associated with the second component in the selected reference architecture matches the component type of the first component in the target environment, and the component identifier affinity associated with the second component in the selected reference architecture matches the component identifier of the first component in the target environment.

11. The method of claim 1 further comprising:
receiving, in the description of the target environment, a description of a firewall including a position of the firewall in the network;
specifying a data flow between components in a selected reference architecture;
determining whether the specified data flow goes through the firewall;
responsive to determining that the specified data flow goes through the firewall, determining a configuration for the firewall to allow the specified data flow; and at least one of:
outputting a description of the configuration of the firewall; and
applying the configuration to the firewall.

12. The method of claim 1 further comprising:
associating one or more sensitivity levels with a zone in the target environment;
associating one or more sensitivity levels with a component in a selected reference architecture; and
placing a component from the selected reference architecture in the zone in an adapted reference architecture for the target environment only when the one or more sensitivity levels associated with the component are within the one or more sensitivity levels associated with the zone.

13. The method of claim 1, wherein adapting a selected reference architecture further comprises:
specifying, in the selected reference architecture, a high availability configuration including one or more redundant components for a component in the selected reference architecture; and
placing, in an adapted reference architecture for the target environment, the one or more redundant components in the selected reference architecture based on the high availability configuration.

14. The method of claim 1, wherein adapting a selected reference architecture further comprises:
specifying, in the selected reference architecture, a performance scaling configuration including performance scaling components for a component in the selected reference architecture; and
placing, in an adapted reference architecture for the target environment, the performance scaling components in the selected reference architecture based on the performance scaling configuration.

15. The method of claim 1 further comprising:
specifying configuration parameter settings for at least one of one or more components and one or more component types in a selected reference architecture; and
determining, in an adapted reference architecture for the target environment, configuration parameter settings for one or more of the at least one of the one or more components and the one or more component types based on the specified configuration parameter settings.

16. The method of claim 1 further comprising:
specifying, in a selected reference architecture, at least one of protocols and configuration parameter settings for communications among components of one or more component types; and
determining, in an adapted reference architecture for the target environment, protocols and configuration parameter settings for communications among the components of the one or more component types based on the specified at least one of protocols and configuration parameter settings.

17. The method of claim 1 further comprising:
specifying at least one of one or more cost, power, or complexity constraints and one or more technology, vendor, or product preferences in the one or more security requirements; and using the specified at least one of one or more cost, power, or complexity constraints and one or more technology, vendor, or product preferences in at least one of selecting and adapting the one or more reference architectures to the target environment.

18. A computer system for formulating a security architecture on an information system, the computer system comprising:
a bus system;
a storage device connected to the bus system, wherein the storage device stores program instructions; and
a processor connected to the bus system, wherein the processor executes the program instructions to:
receive a description of a target environment for the information system, the description including a network zone architecture;
receive a description of one or more security requirements for the information system;
select one or more reference architectures for the information system from a plurality of reference architectures based on the description of the one or more security requirements for the information system;
adapt one or more selected reference architectures to produce one or more adapted reference architectures for the target environment for the information system; and
update an adapted reference architecture when a corresponding reference architecture in a knowledge base changes.

19. The computer system of claim 18, wherein the processor further executes the program instructions to:
associate at least one of a zone type and a zone identifier with a zone in the target environment;
associate at least one of a zone type affinity and a zone identifier affinity with a component in a selected reference architecture; and
place the component from the selected reference architecture in a network zone in an adapted reference architecture for the target environment where at least one of the zone type affinity associated with the component in the selected reference architecture matches the zone type associated with the zone in the target environment, and the zone identifier affinity associated with the component in the selected reference architecture matches the zone identifier associated with the zone in the target environment.

20. The computer system of claim 18, wherein the processor further executes the program instructions to:
receive, in the description of the target environment, a description of a firewall including a position of the firewall in the network;
specify a data flow between components in the one or more selected reference architectures;
determine whether the specified data flow goes through the firewall;
determine a configuration for the firewall to allow the specified data flow in response to determining that the specified data flow goes through the firewall; and at least one of:
output a description of the configuration of the firewall; and
apply the configuration to the firewall.

21. The computer system of claim 18, wherein the processor further executes the program instructions to:
associate one or more sensitivity levels with a zone in the target environment;
associate one or more sensitivity levels with a component in a selected reference architecture; and
place a component from the selected reference architecture in the zone in an adapted reference architecture for the target environment only when the one or more sensitivity levels associated with the component are within the one or more sensitivity levels associated with the zone.

22. The computer system of claim 18, wherein the processor executing the program instructions to adapt a selected reference architecture further comprises the processor executing the program instructions to:
specify, in the selected reference architecture, a high availability configuration including one or more redundant components for a component in the selected reference architecture; and
place, in an adapted reference architecture for the target environment, the one or more redundant components in the selected reference architecture based on the high availability configuration.

23. A computer program product for formulating a security architecture on an information system, the computer program product comprising a computer readable storage medium having program instructions embodied therewith, the program instructions executable by a computer to cause the computer to perform a method comprising:
receiving a description of a target environment for the information system, the description including a network zone architecture;
receiving a description of one or more security requirements for the information system;
selecting one or more reference architectures for the information system from a plurality of reference architectures based on the description of the one or more security requirements for the information system;
adapting one or more selected reference architectures to produce one or more adapted reference architectures for the target environment for the information system; and
updating an adapted reference architecture when a corresponding reference architecture in a knowledge base changes.

24. The computer program product of claim 23 further comprising:
deploying the one or more adapted reference architectures in the target environment.

25. The computer program product of claim 23 further comprising:
combining selected reference architectures and adapting combined reference architectures to the target environment when there is more than one selected reference architecture.

26. The computer program product of claim 23, wherein the receiving of the description of the one or more security requirements for the information system is selected from a group consisting of: receiving one or more applicable threats for the information system, receiving one or more applicable threat classes for the information system, receiving one or more applicable regulations for the information system, and receiving one or more applicable standards for the information system.

27. The computer program product of claim 26 further comprising:
mapping one or more of the received one or more applicable threats to at least one of one or more technical security controls and one or more reference architectures;

mapping one or more of the one or more technical security controls to one or more reference architectures to form one or more mapped reference architectures; and selecting one or more reference architectures from the one or more mapped reference architectures.

* * * * *